US010123055B2

(12) United States Patent
Nakashima

(10) Patent No.: US 10,123,055 B2
(45) Date of Patent: *Nov. 6, 2018

(54) VIDEO CONTENT DISTRIBUTION SYSTEM AND CONTENT MANAGEMENT SERVER

(71) Applicant: COLOPL, Inc., Tokyo (JP)

(72) Inventor: Kento Nakashima, Tokyo (JP)

(73) Assignee: COLOPL, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/374,264

(22) Filed: Dec. 9, 2016

(65) Prior Publication Data
US 2017/0230692 A1    Aug. 10, 2017

(30) Foreign Application Priority Data

Feb. 10, 2016  (JP) .................................. 2016-023492

(51) Int. Cl.
*H04N 21/21*    (2011.01)
*H04N 21/218*    (2011.01)
(Continued)

(52) U.S. Cl.
CPC ....... *H04N 21/21* (2013.01); *H04N 21/21805* (2013.01); *H04N 21/25435* (2013.01); *H04N 21/44204* (2013.01)

(58) Field of Classification Search
CPC ............. H04N 21/21; H04N 21/21805; H04N 21/15435; H04N 21/44204
(Continued)

(56) References Cited

U.S. PATENT DOCUMENTS 6,122,005 A * 9/2000 Sasaki ...................... H04N 7/15
348/14.08
6,934,002 B1 * 8/2005 Setteducati ............ G03B 19/18
348/E7.071
(Continued)

FOREIGN PATENT DOCUMENTS

JP    2002-27427 A    1/2002
JP    2003-224838 A    8/2003
(Continued)

OTHER PUBLICATIONS

Office Action in JP Application No. 2016-023492, dated Oct. 24, 2015.
(Continued)

*Primary Examiner* — Nathan Flynn
*Assistant Examiner* — Caroline Somera
(74) *Attorney, Agent, or Firm* — Hauptman Ham, LLP

(57) ABSTRACT

A video content distribution system including a user terminal on which contents are viewable and a content management server. The user terminal includes a first reception unit configured to receive field-of-view video data. The user terminal includes a display control unit configured to display a field-of-view video. The user terminal includes a viewpoint switch request signal generating unit for requesting a switch from a first viewpoint to a second viewpoint in the field-of-view video. The user terminal includes a first transmission unit configured to transmit the viewpoint switch request signal to the content management server. The content management server includes a second reception unit configured to receive the viewpoint switch request signal. The content management server includes a second transmission unit configured to transmit the field-of-view video data. The content management server further includes a switch (Continued)

count updating unit configured to update a count of switches to the second viewpoint.

17 Claims, 15 Drawing Sheets

(51) Int. Cl.
*H04N 21/2543* (2011.01)
*H04N 21/442* (2011.01)

(58) Field of Classification Search
USPC .................................................. 725/5
See application file for complete search history.

(56) References Cited

U.S. PATENT DOCUMENTS

| | | | | |
|---|---|---|---|---|
| 2004/0031049 | A1* | 2/2004 | Suzuki | H04H 20/28 725/39 |
| 2011/0293241 | A1* | 12/2011 | Umeyama | H04N 9/8205 386/239 |
| 2013/0202265 | A1* | 8/2013 | Arrasvuori | H04N 5/77 386/224 |
| 2015/0035977 | A1* | 2/2015 | Schrepfer | H04N 5/44 348/143 |
| 2016/0006933 | A1* | 1/2016 | Zimmerman | G02B 13/06 348/36 |
| 2017/0026680 | A1* | 1/2017 | Sugio | H04N 21/262 |

FOREIGN PATENT DOCUMENTS

| | | |
|---|---|---|
| JP | 2004-72356 A | 3/2004 |
| JP | 5377466 B2 | 12/2013 |

OTHER PUBLICATIONS

Notice of Allowance in JP Application No. 2016-023492, dated Oct. 11, 2016.

* cited by examiner

FIG. 9

USER VIEWPOINT INFORMATION MANAGEMENT TABLE

| USER ID | VIEWPOINT | TRANSMISSION START TIME |
|---|---|---|
| df678w | $S_1$ | 00:03 |
| . . . | . . . | . . . |

FIG. 10

FIRST CHARGE INFORMATION MANAGEMENT TABLE

| USER ID | SEAT AREA | PER-HOUR CHARGE (YEN) | ACCUMULATED VIEWING PERIOD (MIN) | SEAT CHARGE (YEN) | TOTAL AMOUNT (YEN) |
|---|---|---|---|---|---|
| df678w | S | ¥1000 | 20 | ¥333 | ¥667 |
| | A | ¥800 | 10 | ¥133 | |
| | B | ¥700 | 5 | ¥58 | |
| | C | ¥500 | 5 | ¥42 | |
| | D | ¥300 | 20 | ¥100 | |

FIG. 11

SECOND CHARGE INFORMATION MANAGEMENT TABLE

| USER ID | SEAT AREA | PER-SWITCH CHARGE (YEN) | SWITCH COUNT | SEAT CHARGE (YEN) | TOTAL AMOUNT |
|---|---|---|---|---|---|
| df678w | S | ¥100 | 5 | ¥500 | ¥1230 |
| | A | ¥80 | 2 | ¥160 | |
| | B | ¥70 | 4 | ¥280 | |
| | C | ¥50 | 4 | ¥200 | |
| | D | ¥30 | 3 | ¥90 | |

FIG. 12

CONTENT MANAGEMENT TABLE

| SEAT AREA | CONTENT SERVER ADDRESS |
|---|---|
| S | . . . |
| A | . . . |
| B | . . . |
| C | . . . |
| D | . . . |

VIDEO CONTENT DISTRIBUTION SYSTEM AND CONTENT MANAGEMENT SERVER

RELATED APPLICATIONS

The present application claims priority to Japanese Patent Application Number 2016-023492, filed Feb. 10, 2016, the disclosure of which is hereby incorporated by reference herein in its entirety.

BACKGROUND

This disclosure relates to a video content distribution system and a content management server that is provided in the video content distribution system.

Video content distribution systems configured to distribute video contents over the Internet or other communication networks have been known. In Japanese Patent No. 5,377,466, there is disclosed a video content distribution system configured to distribute a plurality of video contents over a communication network to the general public. Each user can view a video content of his/her choice by selecting a channel that is associated with the video content out of a plurality of channels.

While the video content distribution system disclosed in Japanese Patent No. 5,377,466 allows a user to view a video content that is selected by the user out of a plurality of video contents, a video content distribution system that enables a user to view the same video content from different viewpoints is not disclosed in Japanese Patent No. 5,377,466.

SUMMARY

This disclosure helps to provide a video content distribution system capable of improving the degree of satisfaction with a video content distribution service for a user who views the same video content from different viewpoints. This disclosure also helps to provide a content management server that is provided in the video content distribution system.

According to at least one embodiment of this disclosure, there is provided a video content distribution system, including a user terminal on which contents are viewable and a content management server. The user terminal and the content management server being connected in a manner that allows communication to one another via a communication network. The user terminal includes a first reception unit configured to receive field-of-view video data from the content management server. The user terminal further includes a display control unit configured to display on a display unit a field-of-view video based on the received field-of-view video data. The user terminal further includes a viewpoint switch request signal generating unit configured to generate, in response to input operation performed by a user on the user terminal, a viewpoint switch request signal for requesting a switch from a first viewpoint, which is a current viewpoint, to a second viewpoint in the field-of-view video displayed on the display unit. The user terminal further includes a first transmission unit configured to transmit the generated viewpoint switch request signal to the content management server. The content management server includes a second reception unit configured to receive the viewpoint switch request signal from the user terminal. The content management server further includes a second transmission unit configured to transmit to the user terminal field-of-view video data that is associated with one of the first viewpoint and the second viewpoint. The content management server further includes a switch count updating unit configured to update a count of switches to the second viewpoint.

According to this disclosure, providing the video content distribution system capable of improving the degree of satisfaction with the video content distribution service for the user who views the same video content from different viewpoints is possible.

BRIEF DESCRIPTION OF THE DRAWINGS

FIG. 9 is a table for showing at least one example of a user viewpoint information management table.

FIG. 10 is a table for showing at least one example of a first charge information management table.

FIG. 11 is a table for showing at least one example of a second charge management table.

FIG. 12 is a table for showing at least one example of a content management table.

DESCRIPTION OF THE EMBODIMENTS

Figure 1:
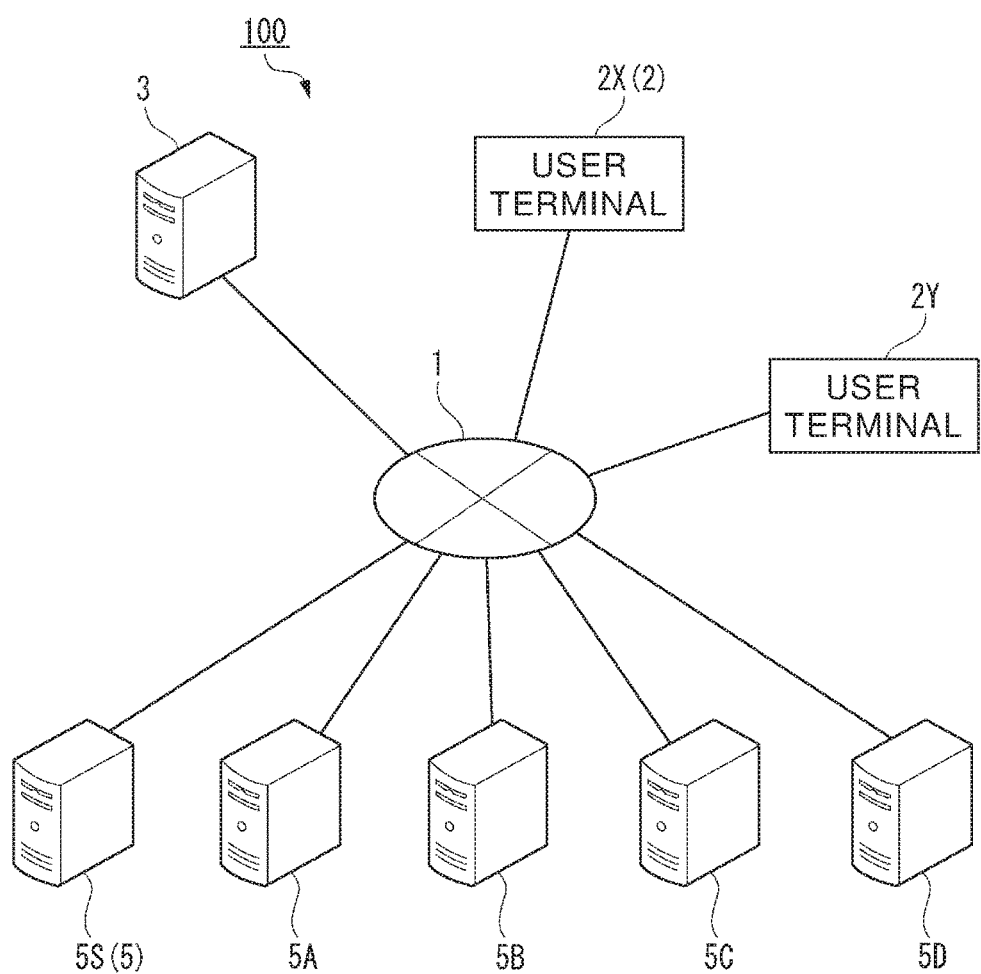
FIG. 1 is a block diagram of a video content distribution system according to some embodiments of this disclosure.

Embodiments of this disclosure include at least the following items.

(1) A video content distribution system, including a user terminal on which contents are viewable and a content management server. The user terminal and the content management server being connected in a manner that allows communication to one another via a communication network. The user terminal includes a first reception unit configured to receive field-of-view video data from the content management server. The user terminal further includes a display control unit configured to display on a display unit a field-of-view video based on the received field-of-view video data. The user terminal further includes a viewpoint switch request signal generating unit configured to generate, in response to input operation performed by a user on the user terminal, a viewpoint switch request signal for requesting a switch from a first viewpoint, which is a current viewpoint, to a second viewpoint in the field-of-view video displayed on the display unit. The user terminal further includes a first transmission unit configured to transmit the generated viewpoint switch request signal to the content management server. The content management server includes a second reception unit configured to receive the viewpoint switch request signal from the user terminal. The content management server further includes a second transmission unit configured to transmit to the user terminal field-of-view video data that is associated with one of the first viewpoint and the second viewpoint. The content management server further includes a switch count updating unit configured to update a count of switches to the second viewpoint.

According to the configuration described above, the count of switches to the second viewpoint, which is a switched-to viewpoint, is updated, and the number of times a switch to a switched-to viewpoint has been made is updated each time the user switches the viewpoint of a field-of-view video. This enables the video content distribution system to obtain, for each user and for each viewpoint, data about the count of viewpoint switches during the user's viewing of a field-of-view video, and the data about the viewpoint switch count of each viewpoint can be used in analyzing the way the user enjoys the video content. In this manner, the data about the viewpoint switch count obtained for each user and each viewpoint can be utilized to improve the user's degree of satisfaction with a video content distribution service.

(2) A video content distribution system according to Item (1), in which the content management server is configured to keep transmitting field-of-view video data that is associated with the first viewpoint to the user terminal at least for a period from a time when the first transmission unit transmits the viewpoint switch request signal to the second reception unit to a time when the first reception unit receives field-of-view video data that is associated with the second viewpoint from the content management server, or at least for a period from a time when the second reception unit receives the viewpoint switch request signal to a time when the second transmission unit transmits field-of-view video data that is associated with the second viewpoint.

According to the configuration described above, field-of-view video data that is associated with the first viewpoint is kept transmitted to the user terminal at least for a period from the time when the first transmission unit transmits the viewpoint switch request signal to the second reception unit to the time when the first reception unit receives field-of-view video data that is associated with the second viewpoint from the content management server, or at least for a period from the time when the second reception unit receives the viewpoint switch request signal to the time when the second transmission unit transmits field-of-view video data that is associated with the second viewpoint. In this manner, when viewpoint switching operation for switching from the first viewpoint to the second viewpoint is performed on a field-of-view image provided to the user terminal, the field-of-view image of the first viewpoint is switched seamlessly to the field-of-view image of the second view point, thereby allowing the user to enjoy viewing the field-of-view image from different viewpoints without being frustrated.

A video content distribution system capable of improving the degree of satisfaction with a video content distribution service for a user who views the same video content from different viewpoints can thus be provided.

(3) A video content distribution system according to Item (1) or (2), in which the content management server further includes a charge calculating unit configured to determine an amount to be charged to the user for the viewing of the field-of-view video based on a count of switches to each viewpoint.

According to the configuration described above, the amount to be charged to the user for the viewing of a field-of-view video is determined based on the viewpoint switch count of each viewpoint, and a metered-rate charging system that is based on the viewpoint switch count of each viewpoint can thus be provided. This helps to improve the user's degree of satisfaction with a video distribution service and to convince the user more that the charge for the service is fair.

(4) A video content distribution system according to any one of Items (1) to (3), in which the switch count updating unit is configured to update the count of switches to the second viewpoint when the second transmission unit transmits the field-of-view video data that is associated with the second viewpoint to the user terminal.

According to the configuration described above, the count of switches to the second viewpoint is updated when the second transmission unit transmits field-of-view video data that is associated with the second viewpoint to the user terminal. Updating the count of switches to a switched-to viewpoint (i.e., increasing the switch count by one) is therefore prevented when field-of-view video data that is associated with the switched-to viewpoint is not transmitted successfully to the user terminal due to a failure on the server side. This helps to improve the user's degree of satisfaction with a video content distribution service and to convince the user more that the charge for the service is fair.

(5) A video content distribution system according to any one of Items (1) to (3), in which the user terminal further includes a time stamp generating unit configured to generate a time stamp that indicates a display start time at which the display control unit starts displaying a field-of-view video from the second viewpoint on the display unit. The switch count updating unit is configured to update the count of switches to the second viewpoint when the second reception unit receives the time stamp from the user terminal.

According to the configuration described above, the count of switches to the second viewpoint is updated when the second transmission unit receives the time stamp from the user terminal. Updating the count of switches to a switched-to viewpoint (i.e., increasing the switch count by one) is therefore prevented when the user cannot view a field-of-view video from the switched-to viewpoint due to a communication trouble between the content management server and the user terminal or the like. This helps to improve the user's degree of satisfaction with a video content distribution service and to convince the user more that the charge for the service is fair.

(6) A video content distribution system according to any one of Items (1) to (5), in which the switch count updating unit is configured to update a count of switches to a seat area that is associated with the second viewpoint. The charge calculating unit is configured to determine an amount to be charged to the user for the viewing of the field-of-view video based on a count of switches to each seat area.

According to the configuration described above, the amount to be charged to the user for the viewing of a field-of-view video is determined based on the switch count of each seat area, and a metered-rate charging system that is based on the switch count of each seat area can thus be provided. This helps to improve the user's degree of satisfaction with a video distribution service and to convince the user more that the charge for the service is fair.

(7) A content management server, which is connected to a user terminal on which contents are viewable in a manner that allows communication between the user terminal and the content management server via a communication network. The content management server includes a second reception unit configured to receive from the user terminal a viewpoint switch request signal for requesting a switch from a first viewpoint, which is a current viewpoint, to a second viewpoint in a field-of-view video displayed on the user terminal. The content management server further includes a second transmission unit configured to transmit to the user terminal field-of-view video data that is associated with one of the first viewpoint and the second viewpoint. The content management server further includes a switch count updating unit configured to update a count of switches to the second viewpoint.

According to the configuration described above, the count of switches to the second viewpoint, which is a switched-to viewpoint, is updated, and the number of times a switch to a switched-to viewpoint has been made is updated each time the user switches the viewpoint of a field-of-view video. This enables the video content distribution system to obtain, for each user and for each viewpoint, data about the count of viewpoint switches during the user's viewing of a field-of-view video, and the data about the viewpoint switch count of each viewpoint can be used in analyzing the way the user enjoys the video content. In this manner, the data about the viewpoint switch count obtained for each user and each viewpoint can be utilized to improve the user's degree of satisfaction with a video content distribution service.

(8) A content management server according to Item (7), in which field-of-view video data that is associated with the first viewpoint is kept transmitted to the user terminal at least for a period from a time when the second reception unit receives the viewpoint switch request signal to a time when the second transmission unit transmits field-of-view video data that is associated with the second viewpoint.

According to this configuration, field-of-view video data that is associated with the first viewpoint is kept transmitted to the user terminal at least for a period from the time when the second reception unit receives the viewpoint switch request signal to the time when the second transmission unit transmits field-of-view video data that is associated with the second viewpoint. In this manner, when a switch from the first viewpoint to the second viewpoint is made in a field-of-view image provided to the user terminal, the field-of-view image of the first viewpoint is switched seamlessly to the field-of-view image of the second view point, thereby allowing the user to enjoy viewing the field-of-view image from different viewpoints without being frustrated.

A content management server capable of improving the degree of satisfaction with a video content distribution service for a user who views the same video content from different viewpoints can thus be provided.

Some embodiments of this disclosure are described below with reference to the drawings. Once a component is described in this description of embodiments, a description on a component having the same reference number as that of the already described component is omitted for the sake of convenience.

FIG. 1 is a block diagram of a video content distribution system 100 according to some embodiments of this disclosure. As illustrated in FIG. 1, the video content distribution system 100 includes a plurality of user terminals 2X and 2Y, on which video contents can be viewed, a content management server 3, and a plurality of content servers 5S, 5A, 5B, 5C, and 5D. The user terminals 2X and 2Y, the content management server 3, and the content servers 5S, 5A, 5B, 5C, and 5D are connected via a communication network 1, which is a local area network (LAN), a wide area network (WAN), the Internet, or the like, in a manner that allows communication to one another. In the following description, the user terminals 2X and 2Y are simply referred to as "user terminals 2", the content servers 5S, 5A, 5B, 5C, and 5D are simply referred to as "contents servers 5" for the sake of convenience. The user terminals 2X and 2Y have the same configuration. The content servers 5S, 5A, 5B, 5C, and 5D have the same configuration.

Figure 2:
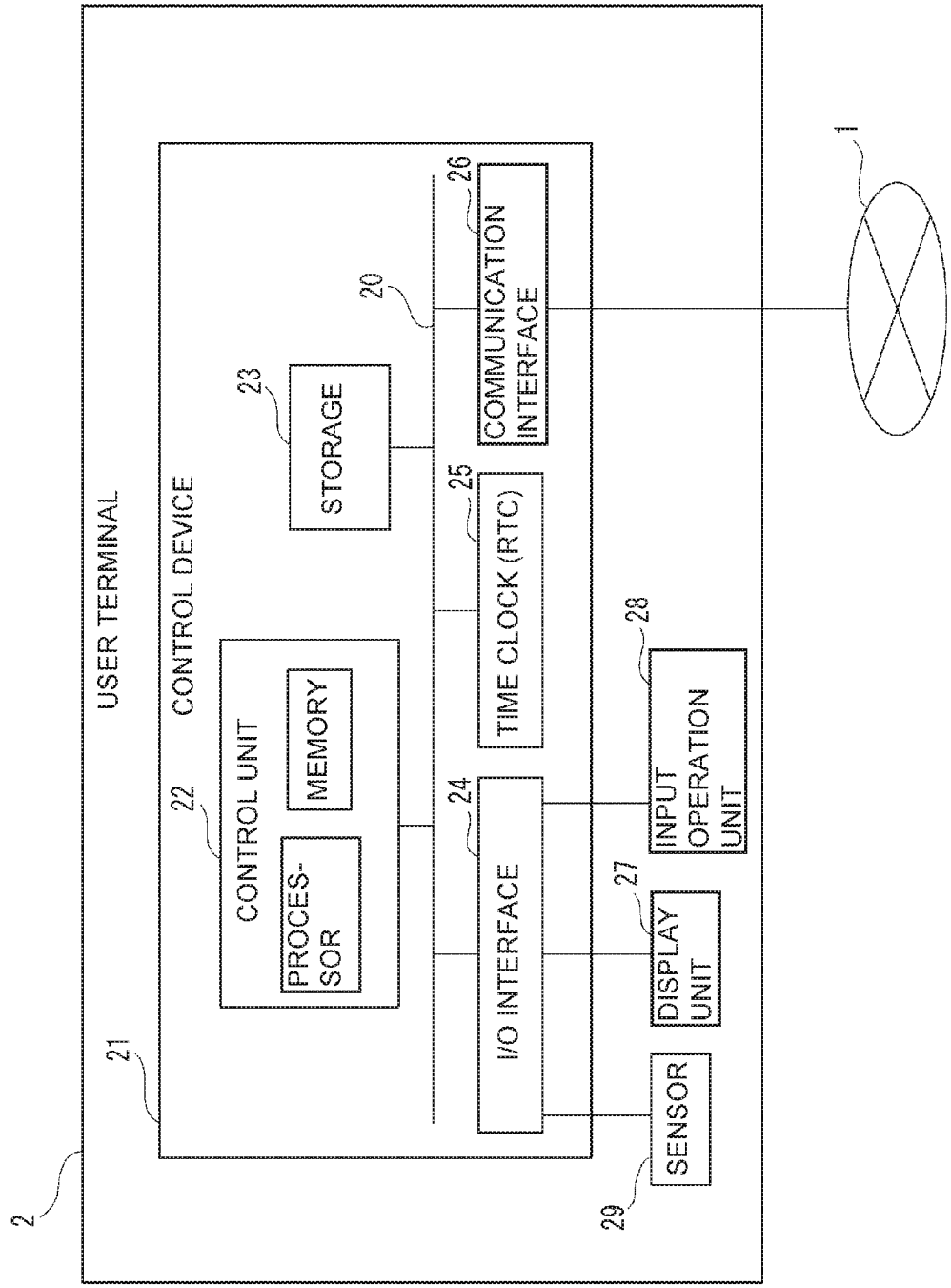
FIG. 2 is a diagram of at least one example of the hardware configuration of a user terminal.

The hardware configuration of the user terminals 2 is described next with reference to FIG. 2. As illustrated in FIG. 2, each user terminal 2 includes a control device 21, an input operation unit 28, a display unit 27, and a sensor 29. The control device 21 includes a communication bus 20, a control unit 22, a storage 23, an input/output (I/O) interface 24, a time clock 25, and a communication interface 26. The control unit 22, the storage 23, the I/O interface 24, the time clock 25, and the communication interface 26 are connected by the communication bus 20 in a manner that allows communication to one another. The control unit 21 is, for example, a personal computer, a smartphone, a tablet, or a wearable device.

The control unit 22 includes a memory and a processor. The memory is built from, for example, a read only memory (ROM) on which various programs are stored, or a random access memory (RAM) that has a plurality of work areas where various programs executed by the processor and data are stored. The RAM includes a VRAM on which video data associated with a video that is displayed on the display unit 27 is stored. The processor is built from at least one of a central processing unit (CPU), a micro-processing unit (MPU), or a graphic processing unit (GPU).

The storage 23 is configured to store various programs and video data among others, and is built from, for example, a hard disk drive (HDD), a solid state drive (SSD), a flash memory, or the like. The I/O interface 24 is configured to connect the input operation unit 28, the display unit 27, and the sensor 29 to the control device 21 in a manner that allows communication to and from the control device 21. The I/O interface 24 is built from, for example, a universal serial bus (USB) terminal or a High-Definition Multimedia Interface (HDMI®).

The time clock 25 is configured to count the current time and is, for example, a real time clock (RTC). The time clock 25 may be synchronized with the time of a device in the network (for example, the content management server 3) by using the Network Time Protocol (NPT). The communication interface 26 is configured to connect the user terminal 2 to the communication network 1.

The input operation unit 28 is configured to receive input operation from a user on the user terminal 2, and to generate an operation signal that indicates the user's input operation in response to the user's input operation. The input operation unit 28 is, for example, a touch panel, an external controller, a mouse, or a keyboard. The display unit 27 is configured to display a field-of-view video based on field-of-view video data, and is, for example, a head-mounted display (HMD) on which a three-dimensional image is provided to the user. The HMD displays a left-eye image provided to the left eye of the user and a right-eye image provided to the right eye of the user, thereby providing a three-dimensional image that utilizes the parallax between the left and right eyes to the user as a virtual reality (VR) image. The display unit 27 may instead be the display of a personal computer, a smartphone, or a tablet.

The sensor 29 is configured to detect the movement of the user wearing the HMD by detecting the HMD's movement in XYZ directions and rotation about XYZ axes. A change in sight line due to the movement of the user's head is detected in this manner. The sensor 29 may be built from at least one of a geomagnetic sensor, an acceleration sensor, or a gyro-sensor that are provided in the HMD, or from an external camera that detects a plurality of light emission points provided in the HMD.

Figure 3:
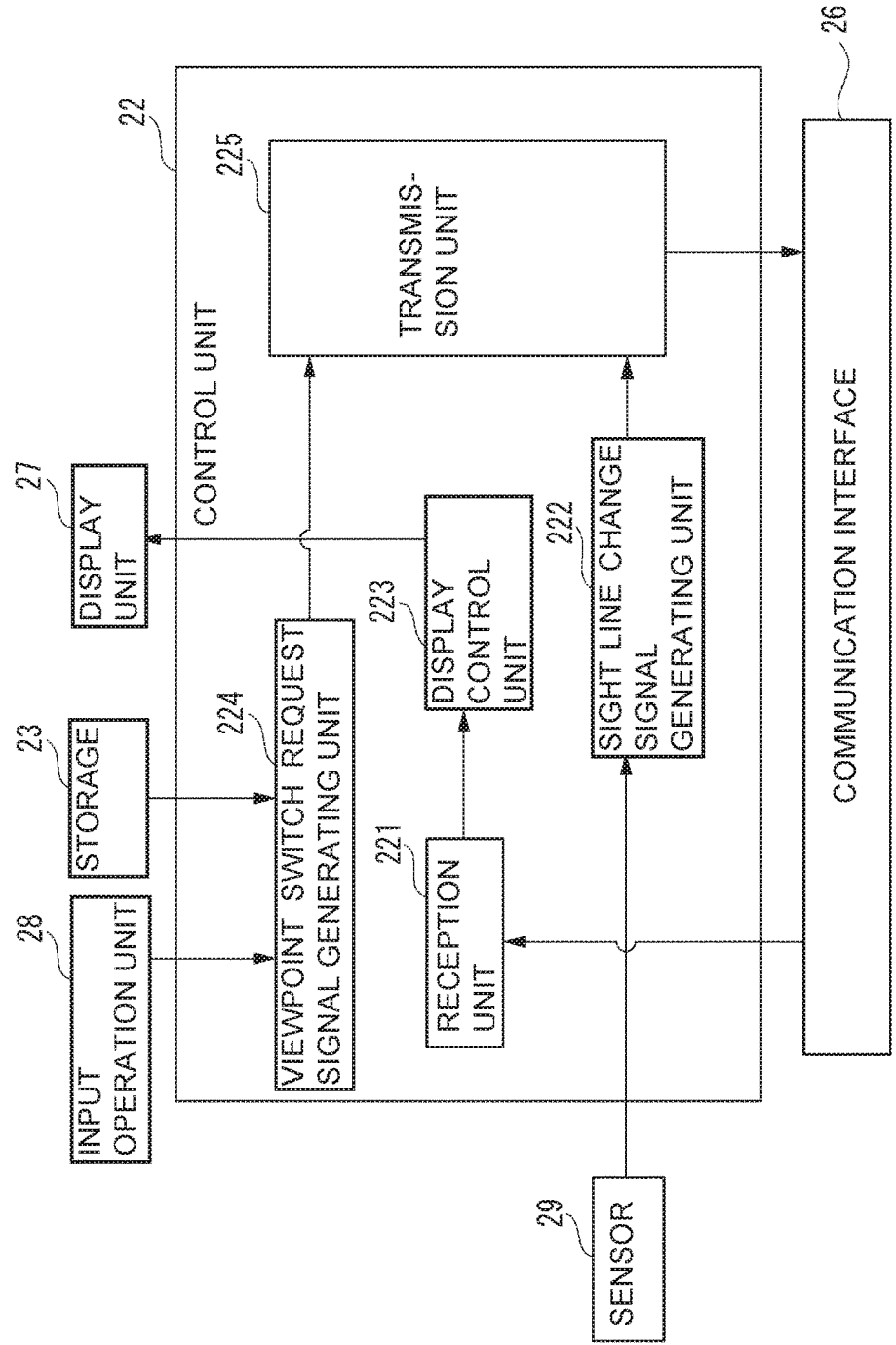
FIG. 3 is a diagram of function blocks of a control unit of the user terminal according to at least one embodiment of this disclosure.

Function blocks of the control unit 22 of the user terminal 2 are described next with reference to FIG. 3. FIG. 3 is a diagram of function blocks of the control unit 22 of the user terminal 2. As illustrated in FIG. 3, the control unit 22 includes a reception unit 221 (a first reception unit), a display control unit 223, a sight line change signal generating unit 222, a viewpoint switch request signal generating unit 224, and a transmission unit 225 (a first transmission unit).

The reception unit 221 is configured to receive field-of-view video data from the content management server 3 via the communication interface 26. The reception unit 221 may receive field-of-view video data in, for example, a streaming format. The reception unit 221 may receive 360-degree space video data that includes field-of-view video data from the content management server 3. In this case, the control unit 22 (the display control unit 223) may generate field-of-view video data from the received 360-degree space video data and from sight line information, which is about the direction of the user's line of sight. The display control unit 223 is configured to display a field-of-view video on the display unit 27 based on the received field-of-view video data. A field-of-view video is a virtual reality (VR) video that is displayed within the user's field of view out of a 360-degree space video centered about the user's viewpoint. In other words, a field-of-view video is a part of a 360-degree space video centered about the user's viewpoint, and is defined by the user's field of view. The user's field of view is defined by the direction of the user's line of sight. In short, when the direction of the user's line of sight is determined, the user's field of view is determined and a field-of-view video is determined. Similarly, a change in the direction of the user's line of sight causes a change in the user's field of view, which changes the field-of-view video. Types of field-of-view videos include, for example, concert videos, videos of sports such as soccer, baseball, sumo, combat sports, and tennis, and videos of theatrical art such as kabuki, noh, and musicals.

The sight line change signal generating unit 222 is configured to generate a sight line change signal based on a signal that is output by the sensor 29 to indicate a change in the direction of the user's line of sight. The sight line change signal contains sight line information that is related to the changed sight line direction.

The viewpoint switch request signal generating unit 224 is configured to generate a viewpoint switch request signal for requesting a switch from the current viewpoint to the next viewpoint in a field-of-view video that is being displayed on the display unit 27 as instructed by input operation performed by the user on the user terminal 2. Specifically, the viewpoint switch request signal generating unit 224 generates sight line information that indicates the line of sight after the switch based on an operation signal, which is output from the input operation unit 28 and which indicates the user's input operation, and reads user ID information of the user who is using [JP1][k2] the user terminal 2 and address information of the user terminal 2 out of the storage 23. In at least one embodiment, a charge associated with a user ID information is attributed to a user corresponding to that user ID information. A viewpoint switch request signal thus contains sight line information, user ID information, and address information of the user terminal 2.

Figure 4:
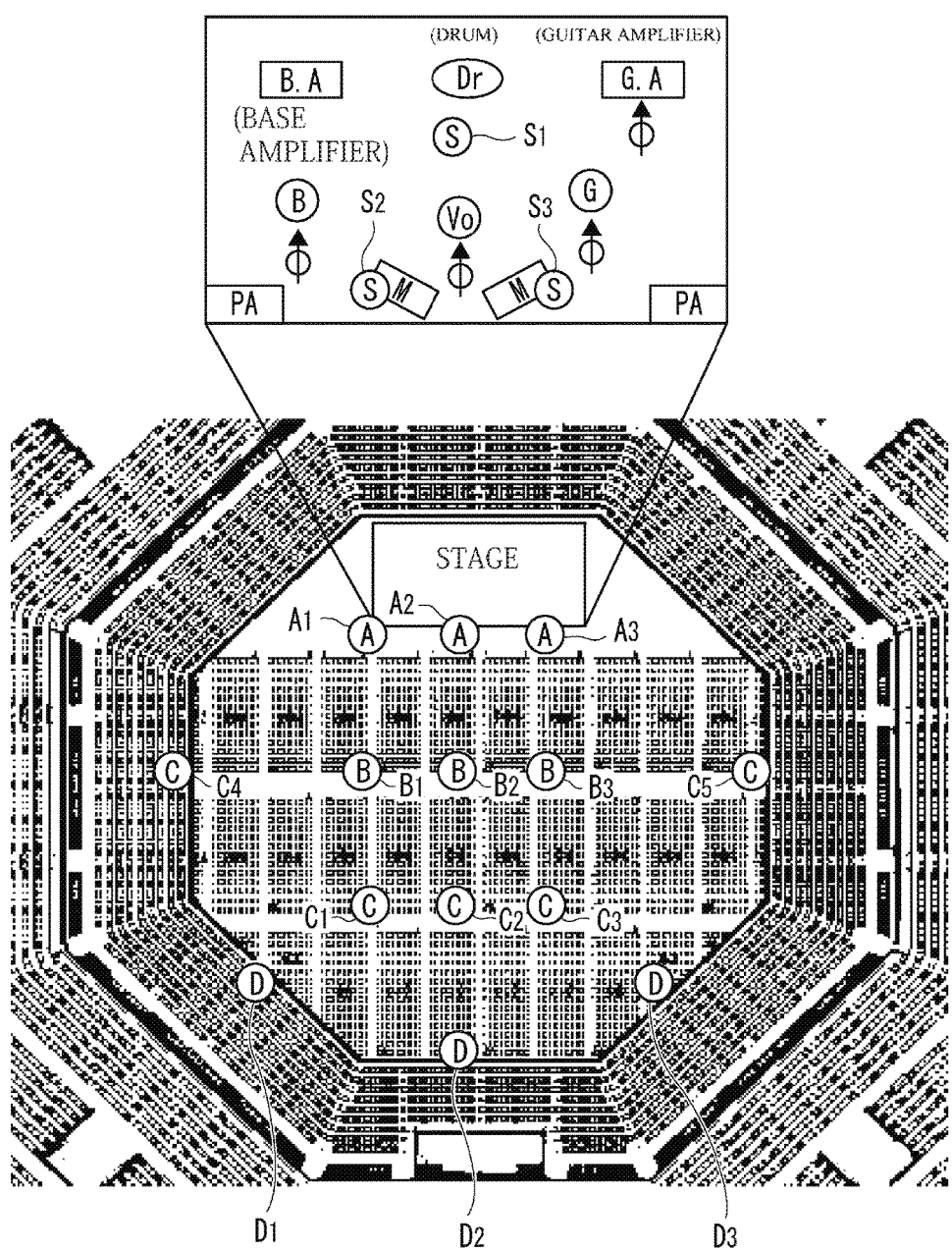
FIG. 4 is a diagram of at least one example of the layout of audience seats in a concert hall in which a plurality of viewpoints are specified.

Viewpoints in a field-of-view video correspond to, for example, viewpoints A1, A2, A3 and so on in a concert hall as illustrated in FIG. 4. Viewpoints S1, S2, and S3 are located in on a stage where artists perform. The viewpoints S1, S2, and S3 are viewpoints belonging to an S-seat area. The viewpoints A1, A2, and A3 are viewpoints belonging to an A-seat area. Viewpoints B1, B2, and B3 are viewpoints belonging to a B-seat area. Viewpoints C1 to C5 are viewpoints belonging to a C-seat area. Viewpoints D1 to D3 are viewpoints belonging to a D-seat area. As shown in FIG. 10, a viewing charge per hour is set for each seat area (the S-seat area and the A-seat area to the D-seat area) separately (for example, 1,000 yen/hour for the S-seat area). A switching charge per viewpoint switch is also set for each seat area (the S-seat area and the A-seat area to the D-seat area) as shown in FIG. 11 (for example, 100 yen/switch for the S-seat area). Herein, the concept of "viewpoint" and the concept of "seat area" are thus different from each other, and each viewpoint belongs to one of seat areas for which separate viewing charges and separate switching charges are set. In the following description, the S-seat area and the A-seat area may simply be referred to as "S-seat" and "A-seat", respectively. The expression "S-seat area viewpoint" may be used as a collective term to refer to one of the viewpoints S1, S2, and S3. Similarly, the expression "A-seat area viewpoint" may be used as a collective term to refer to one of the viewpoints A1, A2, and A3, the expression "C-seat area viewpoint" may be used as a collective term to refer to one of the viewpoints C1 to C5, and the expression "D-seat area viewpoint" may be used as a collective term to refer to one of the viewpoints D1 to D3. While each seat area includes a plurality of viewpoints in at least one embodiment, one viewpoint may be included in each seat area. In other words, seat areas and viewpoints may have a one-to-one relationship.

The viewpoint switch request signal generating unit 224 generates, for example, a viewpoint switch request signal for requesting a switch from the viewpoint A, which is the current viewpoint, to the viewpoint S1, which is the next viewpoint, in a field-of-view video that is being displayed on the display unit 27. User ID information of a user is, for example, a member ID that the user enters to use a video content distribution service. Address information of the user terminal 2 is, for example, the IP address of the user terminal 2. The viewpoint switch request signal generating unit 224 may also generate a viewpoint switch request signal for requesting a switch from one viewpoint that belongs to one seat area (e.g., the viewpoint S1) to another viewpoint that belongs to the same seat area (e.g., the viewpoint S2) in a field-of-view video displayed on the display unit 27.

The transmission unit 225 is configured to transmit, to the content management server 3, via the communication interface 26, a viewpoint switch request signal generated by the viewpoint switch request signal generating unit 224 and a sight line change signal generated by the sight line change signal generating unit 222. In the case where the user terminal 2 receives 360-degree space video data from the content management server 3, the sight line change signal is not transmitted to the content management server 3.

Figure 5:
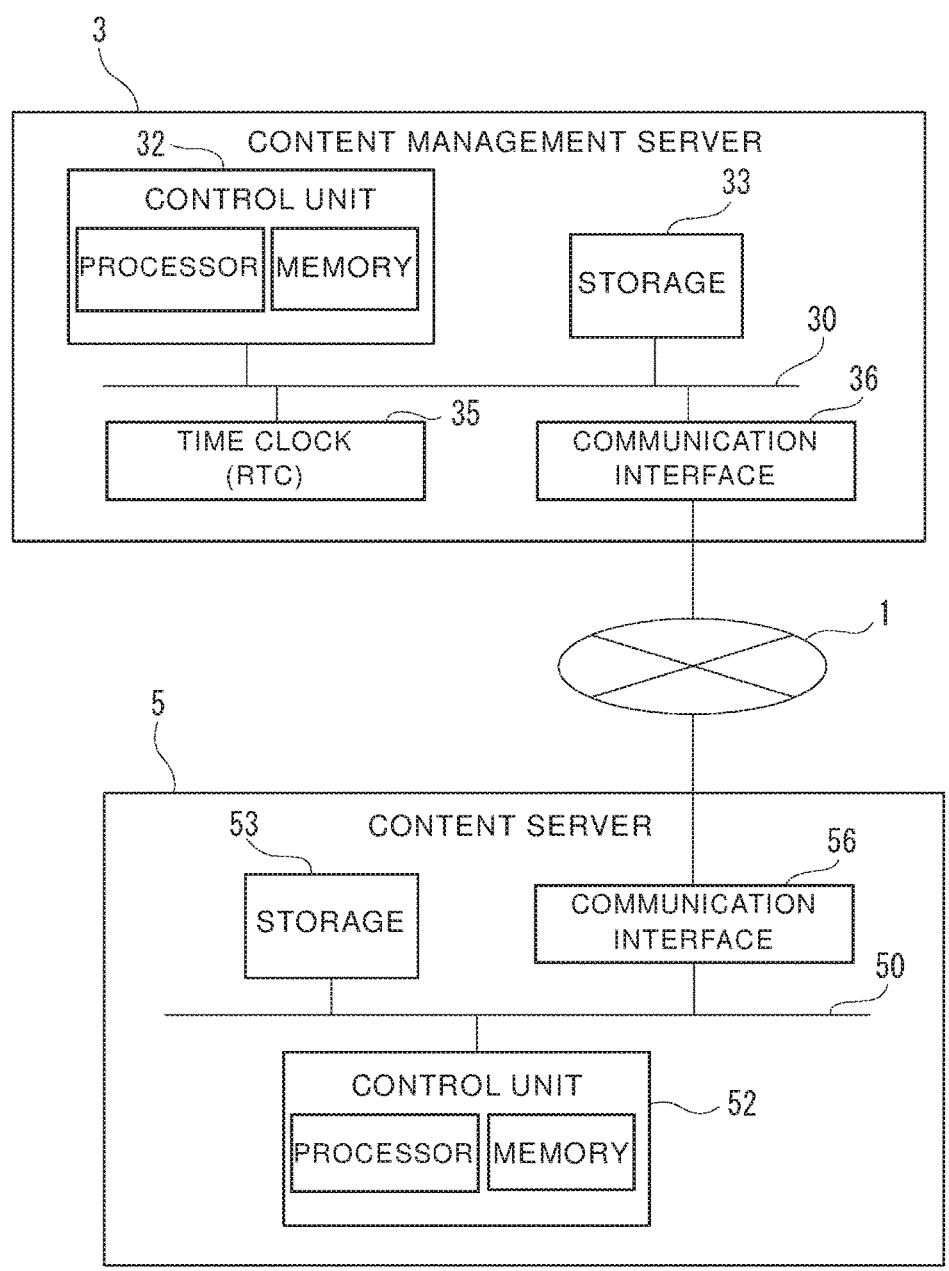
FIG. 5 is a diagram of at least one example of the hardware configurations of a content management server and content servers.

The hardware configuration of the content management server 3 and the hardware configuration of the content servers 5 are described next with reference to FIG. 5. FIG. 5 is a diagram of at least one example of the hardware configurations of the content management server 3 and the content servers 5. As illustrated in FIG. 5, the content management server 3 includes a communication bus 30, a control unit 32, a storage 33, a time clock 35, and a communication interface 36. The control unit 32, the storage 33, the time clock 35, and the communication interface 36 are connected via the communication bus 30 in a manner that allows communication to one another. The control unit 32 includes a memory and a processor. The memory is built from, for example, a ROM or a RAM. The processor is built from, for example, at least one of a CPU, an MPU, or a GPU.

The storage 33 is configured to store various programs and video data among others, and is built from, for example, HDD, SSD, a flash memory, or the like. The time clock 35 has a similar configuration as that of the already described time clock 25, and may be synchronized with the time of the user terminal and others by using the NTP. The communication interface 36 is configured to connect the content management server 3 to the communication network 1.

The content server 5 includes a communication bus 50, a control unit 52, a storage 53, and a communication interface 56. The control unit 52, the storage 53, and the communication interface 56 are connected via the communication bus 50 in a manner that allows communication to one another. The control unit 52 includes a memory and a processor. The memory is built from, for example, a ROM or a RAM. The processor is built from, for example, at least one of a CPU, an MPU, or a GPU.

The storage 53 is built from, for example, a large-capacity HDD, and is configured to store 360-degree space video data associated with viewpoints. For example, the storage 53 of the content server 5S is configured to store pieces of 360-degree space video data that are associated with the viewpoints S1, S2, and S3 belonging to the S-seat area. The storage 53 of the content server 5A is configured to store pieces of 360-degree space video data that are associated with the viewpoints A1, A2, and A3 belonging to the A-seat area. The storage 53 of the content server 5B is configured to store pieces of 360-degree space video data that are associated with the viewpoints B1, B2, and B3 belonging to the B-seat area. The storage 53 of the content server 5C is configured to store pieces of 360-degree space video data that are associated with the viewpoints C1 to C5 belonging to the C-seat area. The storage 53 of the content server 5D is configured to store pieces of 360-degree space video data that are associated with the viewpoints D1, D2, and D3 belonging to the D-seat area. The pieces of 360-degree space video data of the respective viewpoints may be picked up by a plurality of 360-degree cameras set up in the concert hall. For example, 360-degree space video data of the viewpoint S1 is picked up by a 360-degree camera that is set up at the viewpoint S1. The 360-degree space video data picked up by the 360-degree camera is then stored in the storage 53 of the content server 5S. In at least one embodiment, where the video content distribution system 100 is intended for a user who views the same video content from different viewpoints, pieces of 360-degree space video data stored on the respective content servers 5S, 5A, 5B, 5C, and 5D are of the same video content (for example, the same concert video). While the content servers 5S and 5A to 5D of at least one embodiment each store pieces of 360-degree space video data associated with a plurality of viewpoints that belong to a seat area assigned to the content server, the video content distribution system 100 may instead be provided with a plurality of content servers each configured to store 360-degree space video data that is associated with a single viewpoint. The communication interface 56 of each content server 5 is configured to connect the content server 5 to the communication network 1.

Figure 6:
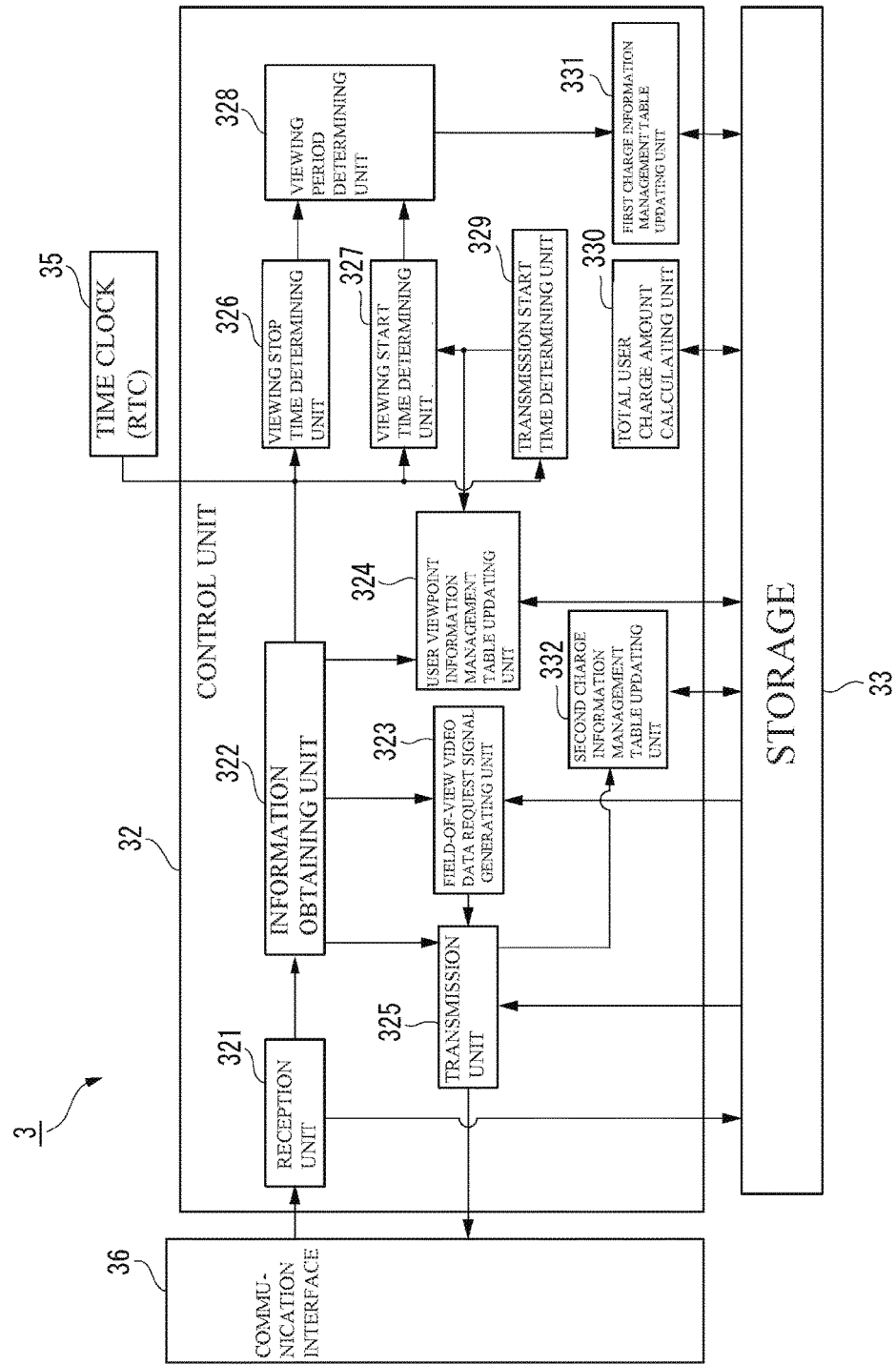
FIG. 6 is a diagram of function blocks of a control unit of the content management server according to at least one embodiment.

Function blocks of the control unit 32 of the content management server 3 according to at least one embodiment are described next with reference to FIG. 6. FIG. 6 is a diagram of function blocks of the control unit 32 of the content management server 3 according to at least one embodiment. As illustrated in FIG. 6, the control unit 32 includes a reception unit 321 (a second reception unit), an information obtaining unit 322, a viewing stop time determining unit 326, a viewing start time determining unit 327, a viewing period determining unit 328, a transmission start time determining unit 329, a first charge information management table updating unit 331, a second charge information management table updating unit 332 (a switch count updating unit), a total user charge amount calculating unit 330 (a charge calculating unit), a user viewpoint information management table updating unit 324, a field-of-view video data request signal generating unit 323, and a transmission unit 325 (a second transmission unit).

The reception unit 321 is configured to receive a viewpoint switch request signal and a sight line change signal from the user terminal 2 via the communication interface 36. The reception unit 321 is also configured to receive field-of-view video data from the content servers 5 via the communication interface 36. The information obtaining unit 322 is configured to obtain user ID information, user viewpoint information, and address information of the user terminal 2 from the viewpoint switch request signal received by the reception unit 321. The information obtaining unit 322 is also configured to obtain sight line information about a changed sight line direction, based on the sight line change signal received by the reception unit 321.

The viewing stop time determining unit 326 is configured to determine a viewing stop time at which the user stops viewing a field-of-view video from the current seat area (for example, the A-seat area). The viewing start time determining unit 327 is configured to determine a viewing start time at which the user starts viewing the field-of-view video from the current seat area (for example, the A-seat area). The viewing period determining unit 328 is configured to determine the length of time in which the field-of-view video is viewed from the current seat area (for example, the A-seat area), based on the viewing start time determined by the viewing start time determining unit 327 and the viewing stop time determined by the viewing stop time determining unit 326.

The transmission start time determining unit 329 is configured to determine a transmission start time at which the transmission unit 325 starts transmitting to the user terminal 2 field-of-view video data that is associated with a post-switch viewpoint (for example, the viewpoint S1). The first charge information management table updating unit 331 is configured to update data in a first charge information management table (see FIG. 10), which is stored in the storage 33. In particular, the first charge information management table updating unit 331 is configured to update the accumulated viewing period of viewing from the current seat area based on how long the field-of-view video has been viewed from the current seat area which is determined by the viewing period determining unit 328.

As shown in FIG. 10, the first charge information management table includes, for each user (each user ID), pieces of information about per-unit time charges associated with the respective seat areas, pieces of information about accumulated viewing periods associated with the respective seat areas, charge amounts associated with the respective seat areas, and the total amount to be charged to the user for the viewing of a field-of-view video. In the example of the first charge information management table of FIG. 10, an amount charged for the viewing of a field-of-view video from the S-seat area is calculated as 333 yen based on 1,000 yen/hour×20 minutes/60 minutes. An amount charged for the viewing of a field-of-view video from the A-seat area is calculated as 133 yen based on 800 yen/hour×10 minutes/60 minutes. For each user ID, the total amount to be charged to the user ID with respect to the length of viewing is calculated by adding up charge amounts that are associated with the respective seat areas. In the example of FIG. 10, the total charge amount is calculated as 667 yen based on 333 yen (S-seat area)+133 yen (A-seat area)+58 yen (B-seat area)+42 yen (C-seat area)+100 yen (D-seat area).

The second charge information management table updating unit 332 is configured to update data in a second charge information management table (see FIG. 11), which is stored in the storage 33. In particular, when the first viewpoint (e.g., the viewpoint A1) is switched from the second viewpoint (e.g., the viewpoint S1) in a field-of-view video displayed on the display unit 27 of the user terminal 2, the second charge information management table updating unit 332 updates the count of switches to the second viewpoint and then updates the switch count of the seat area to which the second viewpoint belongs.

As shown in FIG. 11, the second charge information management table includes, for each user (each user ID), pieces of information about per-switch charges associated with the respective seat areas, pieces of information about switch counts associated with the respective seat areas, charge amounts associated with the respective seat areas, and the total amount to be charged to the user for the switching of the viewpoint of a field-of-view video. In the example of the second charge information management table of FIG. 11, an amount charged for viewpoint switching to the S-seat area is calculated as 500 yen based on 100 yen/switch×5 switches. An amount charged for viewpoint switching to the A-seat area is calculated as 160 yen based on 80 yen/switch×2 switches. For each user ID, the total amount to be charged to the user ID with respect to viewpoint switching is calculated by adding up the charge amounts of the respective seat areas. In the example of FIG. 11, the total charge amount is calculated as 1,230 yen based on 500 yen (S-seat area)+160 yen (A-seat area)+280 yen (B-seat area)+200 yen (C-seat area)+90 yen (D-seat area).

An example of a viewpoint switch count updating process executed by the second charge information management table updating unit 332 is described. When a user X switches the viewpoint of a field-of-view video from the viewpoint S1 to S2, S3, S1, and then to S2 (S1→S2→S3→S1→S2), for example, the second charge information management table updating unit 332 determines the count of switches to the viewpoint S1 as 1, determines the count of switches to the viewpoint S2 as 2, and determines the count of switches to the viewpoint S3 as 1, thereby determining the switch count of the S-seat area as 4. The viewpoint S1 that is the first viewpoint is counted out of the switch count because the second charge information management table updating unit 332 counts the number of times a switch to a switched-to viewpoint is made. In other words, while the viewpoint S1 appears twice in this example, the count of switches to the viewpoint S1 is 1, not 2, which should be noted.

To give another example, when the user X switches the viewpoint of a field-of-view video from the viewpoint S1 to A1, A2, B1, and then to A1 (S1→A1→A2→B1→A1), the second charge information management table updating unit 332 determines the count of switches to the viewpoint S1 as 0, determines the count of switches to the viewpoint A1 as 2, determines the count of switches to the viewpoint A2 as 1 and determines the count of switches to the viewpoint B1 as 1. The second charge information management table updating unit 332 then determines the switch count of the S-seat area as 0, determines the switch count of the A-seat area as 3, and determines the switch count of the B-seat area as 1.

The total user charge amount calculating unit 330 is configured to determine, for each user, the total amount to be charged to the user for the viewing of a field-of-view video, based on the switch counts of the respective seat areas (the S-seat area and the A-seat area to the D-seat area) and on the accumulated viewing periods of the respective seat areas (the S-seat area and the A-seat area to the D-seat area). In other words, the total user charge amount calculating unit 330 is configured to determine, for each user, the total amount to be charged to the user based on the first charge information management table of FIG. 10 and the second charge information management table of FIG. 11.

Specifically, the total user charge amount calculating unit 330 calculates a total charge amount regarding the length of viewing as 667 yen based on 333 yen (S-seat area)+133 yen (A-seat area)+58 yen (B-seat area)+42 yen (C-seat area)+100 yen (D-seat area), based on the accumulated viewing periods of the respective seat areas (the S-seat area and the A-seat area to the D-seat area) that are included in the first charge information management table. The total user charge amount calculating unit 330 further calculates a total charge amount regarding viewpoint switching as 1,230 yen based on 500 yen (S-seat area)+160 yen (A-seat area)+280 yen (B-seat area)+200 yen (C-seat area)+90 yen (D-seat area), based on the switch counts of the respective seat areas (the S-seat area and the A-seat area to the D-seat area) that are included in the second charge information management table. The total user charge amount calculating unit 330 then determines the total amount to be charged to the user X as 1,897 yen by adding up the total charge amount regarding the length of viewing (667 yen) and the total charge amount regarding viewpoint switching (1,230 yen).

In the case where the switch count of the viewpoint S1 is 1, the switch count of the viewpoint S2 is 2, and the switch count of the viewpoint S3 is 2, the switch count of the S-seat area is 5. The total user charge amount calculating unit 330 in this case determines a charge amount based on the count of switches to the S-seat area by multiplying the unit price "100 yen" of the S-seat area by the switch count "5" (100 yen×5=500 yen). In other words, the total user charge amount calculating unit 330 calculates the sum of the switch count of the viewpoint S1, the switch count of the viewpoint S2, and the switch count of the viewpoint S3 to determine a charge amount based on the count of switches to the S-seat area, to which the viewpoints S1 to S3 belong.

The user viewpoint information management table updating unit 324 is configured to update data in a user viewpoint information management table (see FIG. 9), which is stored in the storage 33. In particular, the user viewpoint information management table updating unit 324 adds, for each user, a viewpoint of the user (for example, the viewpoint S1) and a transmission start time (for example, 00:03) of field-of-view video associated with this viewpoint, to the user viewpoint information management table, based on the transmission start time of the field-of-view video data that is determined by the transmission start time determining unit 329 and on the user's viewpoint information obtained by the information obtaining unit 322. In the case where the user's viewpoint switches from the viewpoint A1 to the viewpoint S1, for example, the transmission start time of field-of-view video data that is associated with the viewpoint S1 is newly written in the user viewpoint information management table.

The field-of-view video data request signal generating unit 323 is configured to generate a field-of-view video data request signal for requesting field-of-view video data. In particular, the field-of-view video data request signal generating unit 323 is configured to read information about a post-switch viewpoint by referring to the user viewpoint information management table (see FIG. 9), which is stored in the storage 33. The field-of-view video data request signal generating unit 323 may calculate a play start time at which the field-of-view video is played from the post-switch viewpoint, based on information that is included in the user viewpoint information management table. The field-of-view video data request signal generating unit 323 may also obtain address information (for example, an IP address) of the content server 5 that is associated with the post-switch viewpoint from a content management table (see FIG. 12), which is stored in the storage 33. A field-of-view video data request signal may thus contain address information of the content server 5 and information about a play start time at which the field-of-view video is played from the post-switch viewpoint. The field-of-view video request signal may further contain sight line information obtained by the information obtaining unit 322. The sight line information is one of information about a changed sight line direction and information about the initial sight line direction (for example, a sight line direction toward the center of the stage).

The transmission unit 325 is configured to transmit a field-of-view video data request signal generated by the field-of-view video data request signal generating unit 323 to a desired content server 5 via the communication interface 36 and the communication network 1. In particular, the transmission unit 325 may transmit the field-of-view video data request signal to the desired content server 5 by referring to address information of the desired content server 5. The transmission unit 325 may transmit field-of-view video data obtained from the desired content server 5 to the user terminal 2. The transmission unit 325 may also transmit 360-degree space video data obtained from the desired content server 5 that includes field-of-view video data to the user terminal 2. In this case, the user terminal 2 (the display control unit 223) may generate field-of-view video data from the received 360-degree space video data.

Figure 7:
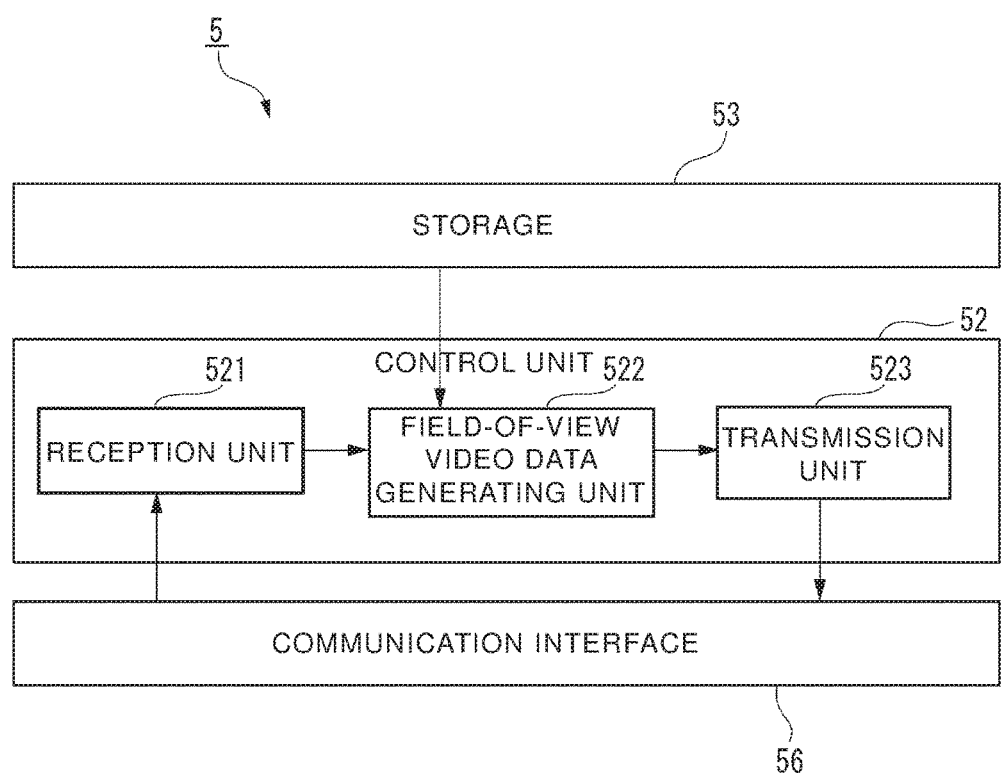
FIG. 7 is a diagram of function blocks of a control unit of each content server according to at least one embodiment.

Function blocks of the control unit 52 of each content server 5 are described next with reference to FIG. 7. FIG. 7 is a diagram of function blocks of the control unit 52 of each content server 5. As illustrated in FIG. 7, the control unit 52 includes a reception unit 521, a field-of-view video data generating unit 522, and a transmission unit 523. The reception unit 521 is configured to receive a field-of-view video data request signal transmitted from the content management server 3. The field-of-view video data generating unit 522 is configured to generate, after reading 360-degree space video data out of the storage 53, field-of-view video data based on the read 360-degree space video data and on the received field-of-view video data request signal. In the case where a field-of-view video data request signal that has the viewpoint S1 as the post-switch viewpoint is received by the content server 5S, for example, the field-of-view video data generating unit 522 reads 360-degree space video data that is associated with the viewpoint S1 out of the storage 53, and then generates field-of-view video data that is associated with the viewpoint S1 based on the read 360-degree space video data and on the received field-of-view video data request signal.

The transmission unit 523 is configured to transmit the field-of-view video data generated by the field-of-view video data generating unit 522 to the content management server 3 via the communication interface 56. The transmission unit 523 may transmit 360-degree space video data that includes field-of-view video data to the content management server 3. In this case, the 360-degree space video data is transmitted from the content management server 3 to the user terminal 2, where field-of-view video data is generated from the received 360-degree space video data.

Figure 8:
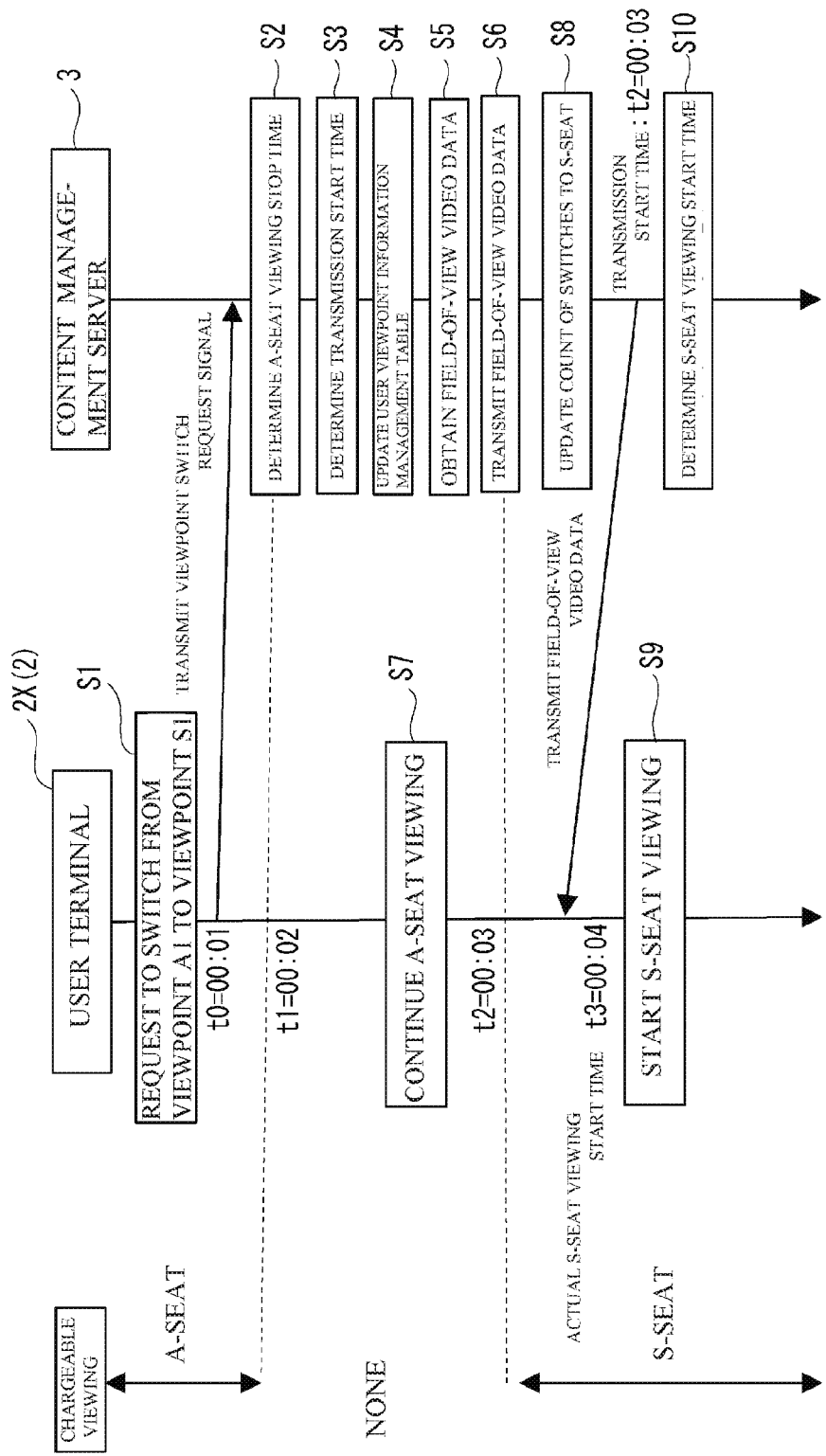
FIG. 8 is a sequence diagram of a series of processes of the video content distribution system according to at least one embodiment.

A series of processes of the video content distribution system 100 according to at least one embodiment is described next with reference to FIG. 8. FIG. 8 is a sequence diagram for illustrating a series of processes of the video content distribution system 100 according to at least one embodiment. The description given here focuses on exchanges of information between the user terminal 2X, which is used by the user X, and the content management server 3 as illustrated in FIG. 8, to thereby describe a charging method of the video content distribution system 100. Exchanges of information between the user terminal 2Y, which is used by a user Y, and the content management server 3 are similar to the exchanges of information between the user terminal 2X and the content management server 3.

In Step S1, the input operation unit 28 receives instructions for switching from the viewpoint A1, which is a pre-switch viewpoint, to the viewpoint S1, which is a post-switch viewpoint. In other words, the input operation unit 28 transmits an operation signal that indicates a request for a switch from the viewpoint A1 to the viewpoint S1 to the viewpoint switch request signal generating unit 224. The viewpoint switch request signal generating unit 224 generates a viewpoint switch request signal for requesting a switch from the viewpoint A1 to the viewpoint S1 in a field-of-view video that is being displayed on the display unit 27, as requested by the operation signal transmitted from the input operation unit 28. Specifically, the viewpoint switch request signal generating unit 224 generates viewpoint information that indicates the viewpoint S1 based on the operation signal transmitted from the input operation unit 28, and reads user ID information of the user X and address information of the user terminal 2X out of the storage 23. The viewpoint switch request signal thus contains the viewpoint information that indicates the viewpoint S1, the user ID information of the user X, and the IP address information of the user terminal 2X.

Next, the transmission unit 225 transmits the generated viewpoint switch request signal to the content management server 3 via the communication interface 26. The time at which the user terminal 2X transmits the viewpoint switch request signal is t0=00:01 as illustrated in FIG. 8.

In Step S2, the viewing stop time determining unit 326 refers to a time on the time clock 35 and information obtained by the information obtaining unit 322, to thereby determine an A-seat viewing stop time (a first viewing stop time) at which the user X stops viewing the field-of-view video from the A-seat area. Specifically, the viewing stop time determining unit 326 determines as the A-seat viewing stop time a time at which the viewpoint switch request signal (information contained in the viewpoint switch request signal, to be exact) is obtained. The viewing stop time is t1=00:02 as illustrated in FIG. 8.

Prior to Step S1, the viewing start time determining unit 327 has determined an A-seat viewing start time (a first viewing start time) at which the user X starts viewing the field-of-view video from the A-seat area. The viewing stop time determining unit 236 does not need to operate (in other words, does not need to determine the A-seat viewing stop time) in the case where a viewpoint switch request signal received by the reception unit 321 is a request for a switch from the viewpoint A1 in the A-seat area to the viewpoint A2 in the A-seat area (i.e., when the received viewpoint switch request signal is a request for a switch between viewpoints in the same seat area). In such cases, where the viewpoint is switched within the same seat area, the viewpoint start time determining unit 327 does not need to operate either.

In this manner, when the viewpoint switch request signal received by the reception unit 321 is a request for a switch from the viewpoint (for example, the viewpoint A1) that belongs to a given seat area (for example, the A-seat area) to the viewpoint that belongs to a seat area (for example, the S-seat area) different from the given seat area in a field-of-view video displayed on the display unit 27 (or when the viewpoint switch request signal transmitted from the transmission unit 225 is this request), the viewing stop time determining unit 326 determines the first viewing stop time at which the viewing of the field-of-view video from the given seat area is stopped and the viewing start time determining unit 327 determines a second viewing start time at which the viewing of the field-of-view video from the different seat area is started.

The second charge information management table updating unit 332 updates data in the second charge information management table by updating the count of switches to the switched-to viewpoint (the count of switches to a seat area to which the switched-to viewpoint belongs) also when the viewpoint switch request signal received by the reception unit 321 is a request for a switch of viewpoints within the same seat area.

Next, the transmission start time determining unit 329 determines in Step S3 a transmission start time at which the transmission unit 325 starts transmitting field-of-view video data that is associated with the viewpoint S1 to the user terminal 2X, by referring to the current time on the time clock 35 and information obtained by the information obtaining unit 322. The transmission start time is t2=00:03.

In Step S4, the user viewpoint information management table updating unit 324 updates data in the user viewpoint information management table (see FIG. 9), which is stored in the storage 33. In particular, the user viewpoint information management table updating unit 324 writes in the user viewpoint information management table the transmission start time t2=00:03 determined by the transmission start time determining unit 329, the user ID information of the user X that is obtained by the information obtaining unit 322, and the viewpoint information indicating the viewpoint S1 that is obtained by the information obtaining unit 322.

In Step S5, the content management server 3 obtains field-of-view video data that is associated with the viewpoint S1 of the S-seat area from the content server 5S, where 360-degree space video data that is associated with the viewpoint S1 is stored. Specifically, the field-of-view video data request signal generating unit 323 generates a field-of-view video data request signal for requesting field-of-view video data. In particular, the field-of-view video data request signal generating unit 323 reads the viewpoint S1 by referring to the user viewpoint information management table (see FIG. 9), which is stored in the storage 33. The field-of-view video data request signal generating unit 323 further calculates a play start time at which the field-of-view video is played from the viewpoint S1, based on information that is contained in the user viewpoint information management table, and obtains address information of the content server 5S from the content management table (see FIG. 11), which is stored in the storage 33. The field-of-view video data request signal may thus contain the address information of the content server 5S and information about the play start time at which the field-of-view video is played from the viewpoint S1. The field-of-view video data request signal may contain sight line information about the initial sight line direction (for example, a sight line direction toward the center of the stage) when the viewpoint of the field-of-view video is switched.

Next, the transmission unit 325 refers to the address information of the content server 5S, to thereby transmit the field-of-view video data request signal generated by the field-of-view video data request signal generating unit 323 to the content server 5S via the communication interface 36 and the communication network 1. The content server 5S receives the field-of-view video data request signal, and then generates field-of-view video data that is associated with the viewpoint S1 based on the field-of-view video data request signal. The content server 5S transmits the generated field-of-view video data to the content management server 3. Specifically, the reception unit 521 of the content server 5S receives the field-of-view video data request signal, and the field-of-view video data generating unit 522 then reads 360-degree space video data that is associated with the viewpoint S1 out of the storage 53. The field-of-view video data generating unit 522 generates field-of-view video data that is associated with the viewpoint S1 based on the read 360-degree space video data and on the received field-of-view video data request signal. The transmission unit 523 transmits the generated field-of-view video data to the content management server 3 via the communication interface 56. The content management server 3 receives field-of-view video data that is associated with the viewpoint S1 from the content server 5S in this manner.

Next, the content management server 3 transmits in Step S6 the field-of-view video data that is associated with the viewpoint S1 to the user terminal 2X. Specifically, the transmission unit 325 refers to the transmission start time stored in the user viewpoint information management table (t2=00:03) and the address information of the user terminal 2X that is obtained by the information obtaining unit 322, to thereby transmit the field-of-view video data that is associated with the viewpoint S1 and that is stored in the storage 33 to the user terminal 2X in a streaming format. The content management server 3, which transmits the field-of-view video data to the user terminal 2X in at least one embodiment, may instead transmit to the user terminal 2X the 360-degree space video data that includes the field-of-view video data.

During a period from the time when the transmission unit 225 of the user terminal 2X transmits the viewpoint switch request signal to the reception unit 321 of the content management server 3 (t0=00:01) to the time when the reception unit 221 of the user terminal 2X receives the field-of-view video data that is associated with the viewpoint S1 from the content management server 3, the content management server 3 (the transmission unit 325) keeps transmitting field-of-view video data that is associated with the viewpoint A1 and that is stored in the storage 33 to the user terminal 2X in a streaming format. Alternatively, the content management server 3 (the transmission unit 325) continues transmitting field-of-view video data that is associated with the viewpoint A1 and that is stored in the storage 33 to the user terminal 2X in a streaming format during a period from the time when the reception unit 321 of the content management server 3 receives the viewpoint switch request signal from the user terminal 2X to the time when the transmission unit 325 of the content management server 3 transmits the field-of-view video data that is associated with the viewpoint S1 to the user terminal 2X.

This allows the user X to keep viewing the field-of-view video from the viewpoint A1 during the period described above, as shown in Step S7. After a given length of time elapses (t3=00:04) since the time when the user terminal 2X receives the field-of-view video data that is associated with the viewpoint S1, the display control unit 223 displays a field-of-view video from the viewpoint S1 on the display unit 27 based on the field-of-view video data that is associated with the viewpoint S1 (Step S9). This allows the user X to view the field-of-view video that is associated with the viewpoint S1 starting at t3=00:04.

In this manner, when viewpoint switching operation for switching from the viewpoint A1 to the viewpoint S1 is performed on a field-of-view video provided to the user terminal 2X, the field-of-view video from the viewpoint A1 is switched seamlessly to the field-of-view video from the viewpoint S1, thereby allowing the user X to enjoy viewing the field-of-view video from different viewpoints without being frustrated. The video content distribution system 100 and the content management server 3 that are provided in at least one embodiment are thus capable of improving the degree of satisfaction with a video content distribution service for a user who views the same video content from different viewpoints.

Next, the second charge information management table updating unit 332 updates in Step S8 the count of switches to the viewpoint S1 and then updates the count of switches to the S-seat area to which the viewpoint S1 belongs. In particular, when transmitting field-of-view video data that is associated with the viewpoint S1 to the user terminal 2X, the transmission unit 325 transmits to the second charge information management table updating unit 332 a transmission completion signal that indicates the transmission of the field-of-view video data that is associated with the viewpoint S1 to the user terminal 2X. The second charge information management table updating unit 332 updates the count of switches to the viewpoint S1 based on the received transmission completion signal, and then updates the count of switches to the S-seat area. The second charge information management table updating unit 332 updates data in the second charge information management table in this manner. For example, in the case where the count of switches to the viewpoint S1 is 2 and the count of switches to the S-seat area is 5, the second charge information management table updating unit 332 updates the count of switches to the viewpoint S1 from 2 to 3, and then updates the count of switches to the S-seat area to which the viewpoint S1 belongs from 5 to 6.

In Step S10, the viewing start time determining unit 327 determines an S-seat viewing start time (the second viewing start time) at which the user X starts viewing the field-of-view video from the S-seat area. Specifically, the viewing start time determining unit 327 determines as the S-seat viewing start time the transmission start time determined by the transmission start time determining unit 329 (t2=00:03). For example, when the content management server 3 (the reception unit 321) receives after this step a viewpoint switch request signal that requests a switch of the viewpoint of the field-of-view video from the viewpoint S1 to the viewpoint B2, the viewing stop time determining unit 326 determines an S-seat viewing stop time (the second viewing stop time) at which the user X stops viewing the field-of-view video from the S-seat area. Specifically, the viewing stop time determining unit 326 determines as the S-seat viewing stop time an acquisition time at which the viewpoint switch request signal is obtained.

When the content management server 3 (the reception unit 321) receives the viewpoint switch request signal, the viewing stop time determining unit 326 determines the A-seat viewing stop time and the viewing start time determining unit 237 determines the S-seat viewing start time as already described.

The viewing period determining unit 328 determines an A-seat viewing period (a first viewing period) in which the field-of-view video is viewed from the A-seat area, based on the A-seat viewing start time (the first viewing start time) and the A-seat viewing stop time (the first viewing stop time). Specifically, the viewing period determining unit 328 calculates the A-seat viewing period from the difference between the A-seat viewing stop time and the A-seat viewing start time (A-seat viewing stop time−A-seat viewing start time).

Similarly, the viewing period determining unit 328 determines an S-seat viewing period (a second viewing period) in which the field-of-view video is viewed from the S-seat area, based on the S-seat viewing start time (the second viewing start time) and the S-seat viewing stop time (the second viewing stop time). Specifically, the viewing period determining unit 328 calculates the S-seat viewing period from the difference between the S-seat viewing stop time and the S-seat viewing start time (S-seat viewing stop time−S-seat viewing start time).

As described above, according to at least one embodiment, where the count of switches to the viewpoint S1, which is a switched-to viewpoint, the count of switches to a switched-to viewpoint is updated each time the user X switches the viewpoint of a field-of-view video. This means that the video content distribution system 100 obtains, for each user and for each viewpoint, data about the count of viewpoint switches that have been made during the user's viewing of a field-of-view video, and the data about the viewpoint switch count of each viewpoint can be used in analyzing the way the user enjoys the video content. In this manner, the data about the viewpoint switch count obtained for each user and each viewpoint can be utilized to improve the user's degree of satisfaction with a video content distribution service.

An amount to be charged to the user for the viewing of a field-of-view video is determined based on the count of switches to each viewpoint (or each seat area), and a metered-rate charging system that is based on the count of switches to each viewpoint (or each seat area) can therefore be provided. This helps to improve the user's degree of satisfaction with a video distribution service and to convince the user more that the charge for the service is fair.

The count of switches to the viewpoint S1 is updated when the transmission unit 325 transmits field-of-view video data that is associated with the viewpoint S1 to the user terminal 2X. Updating the count of switches to the viewpoint S1 as the switched-to viewpoint (i.e., increasing the switch count by one) is therefore prevented when the field-of-view video data that is associated with the viewpoint S1 as the switched-to viewpoint is not transmitted successfully to the user terminal 2X due to a failure on the server side. This helps to improve the user's degree of satisfaction with a video content distribution service and to convince the user more that the charge for the service is fair.

The A-seat viewing period is determined based on the A-seat viewing start time and the A-seat viewing stop time, and the S-seat viewing period is determined based on the S-seat viewing start time and the S-seat viewing stop time. Because the length of time in which a field-of-view video is viewed is determined for each seat area separately, field-of-view video viewing period data can be recorded for each seat area and for each user, and the viewing period data can be used to improve the user's degree of satisfaction with a video content distribution service.

The first charge information management table updating unit 331 updates the accumulated viewing period that is associated with the A-seat area based on the A-seat viewing period, and updates the accumulated viewing period that is associated with the S-seat area based on the S-seat viewing period (see FIG. 10). According to at least one embodiment, a metered-rate charging system that is based on the field-of-view video viewing period of each seat area can be provided in this manner, which helps to improve the user's degree of satisfaction with a video content distribution service.

The total user charge amount calculating unit 330 determines a total amount based on the lengths of viewing of the respective seat areas (667 yen in FIG. 10) from accumulated viewing periods that are associated with the respective seat areas (the S-seat area and the A-seat area to the D-seat area). A metered-rate charging system that is based on the viewing periods of the respective seat areas (the S-seat area and the A-seat area to the D-seat area) can be provided in this manner, which helps to improve the user's degree of satisfaction with a video content distribution service and to convince the user more that the charge for the service is fair.

According to at least one embodiment, the viewing stop time determining unit 326 determines as the A-seat viewing stop time an acquisition time at which a viewpoint switch request signal (in particular, information contained in a viewpoint switch request signal, for example, user ID information) is obtained (t1=00:02), and a transmission start time at which the transmission unit 325 starts transmitting field-of-view video data that is associated with the viewpoint S1 to the user terminal 2X (t2=00:03) is determined as the S-seat viewing start time. The period between the acquisition time t1 and the transmission start time t2 (1 second) is not counted as a field-of-view video viewing period in this manner, which helps to improve the user's degree of satisfaction with a video content distribution service and to convince the user more that the charge for the service is fair.

Figure 13:
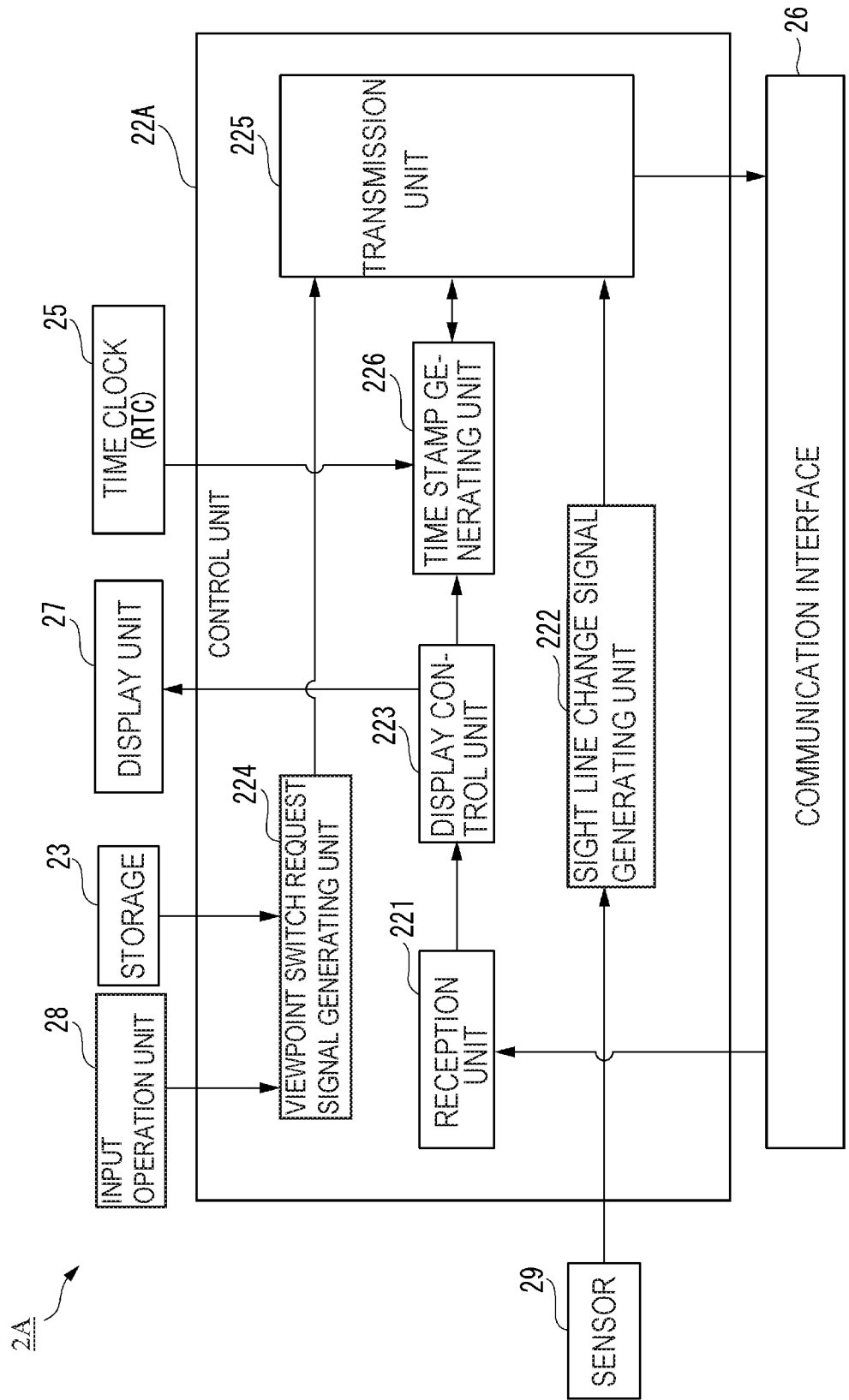
FIG. 13 is a diagram of function blocks of a control unit of the user terminal according to at least one embodiment of this disclosure.
Figure 14:
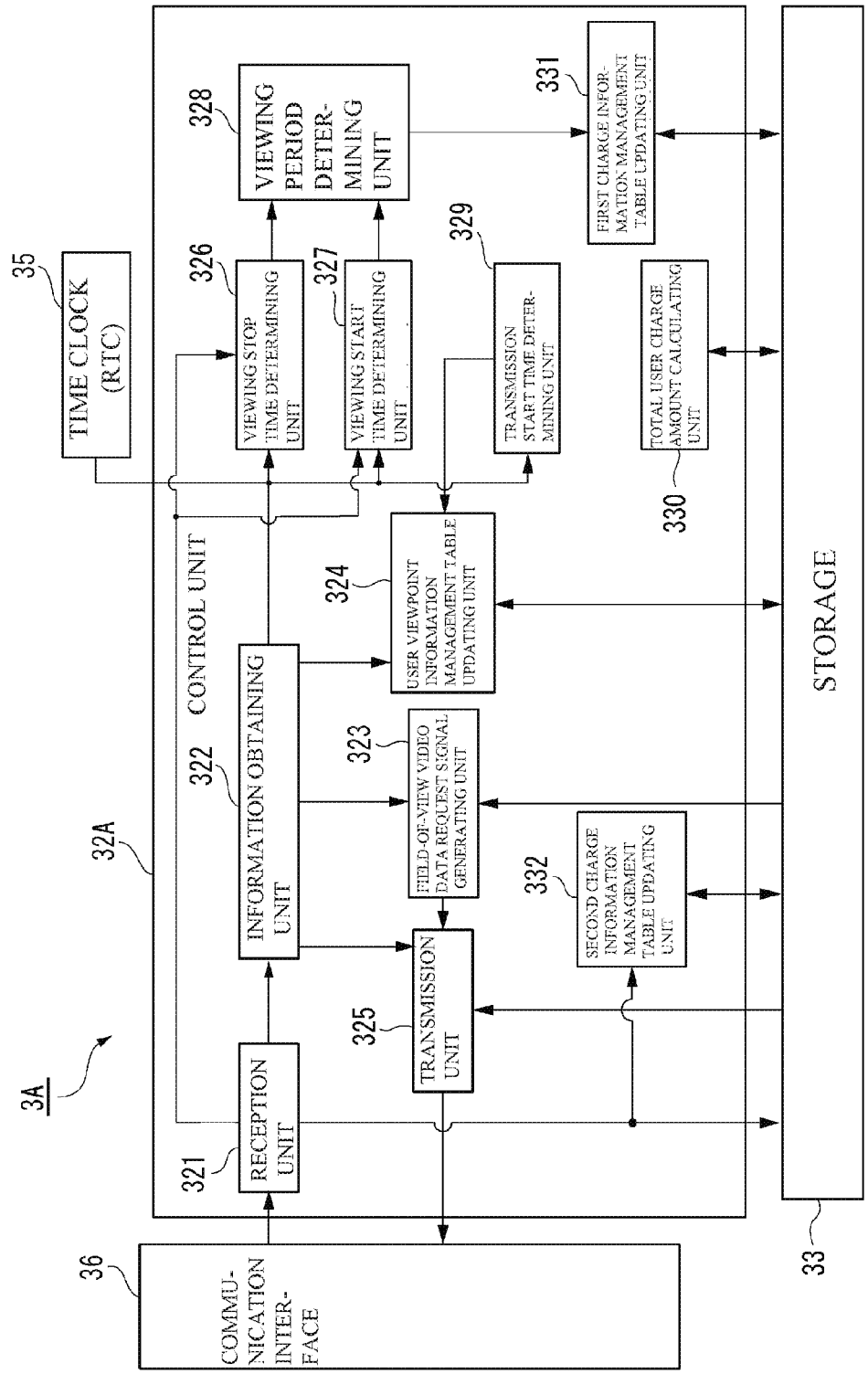
FIG. 14 is a diagram of function blocks of a control unit of the content management server according to at least one embodiment.
Figure 15:
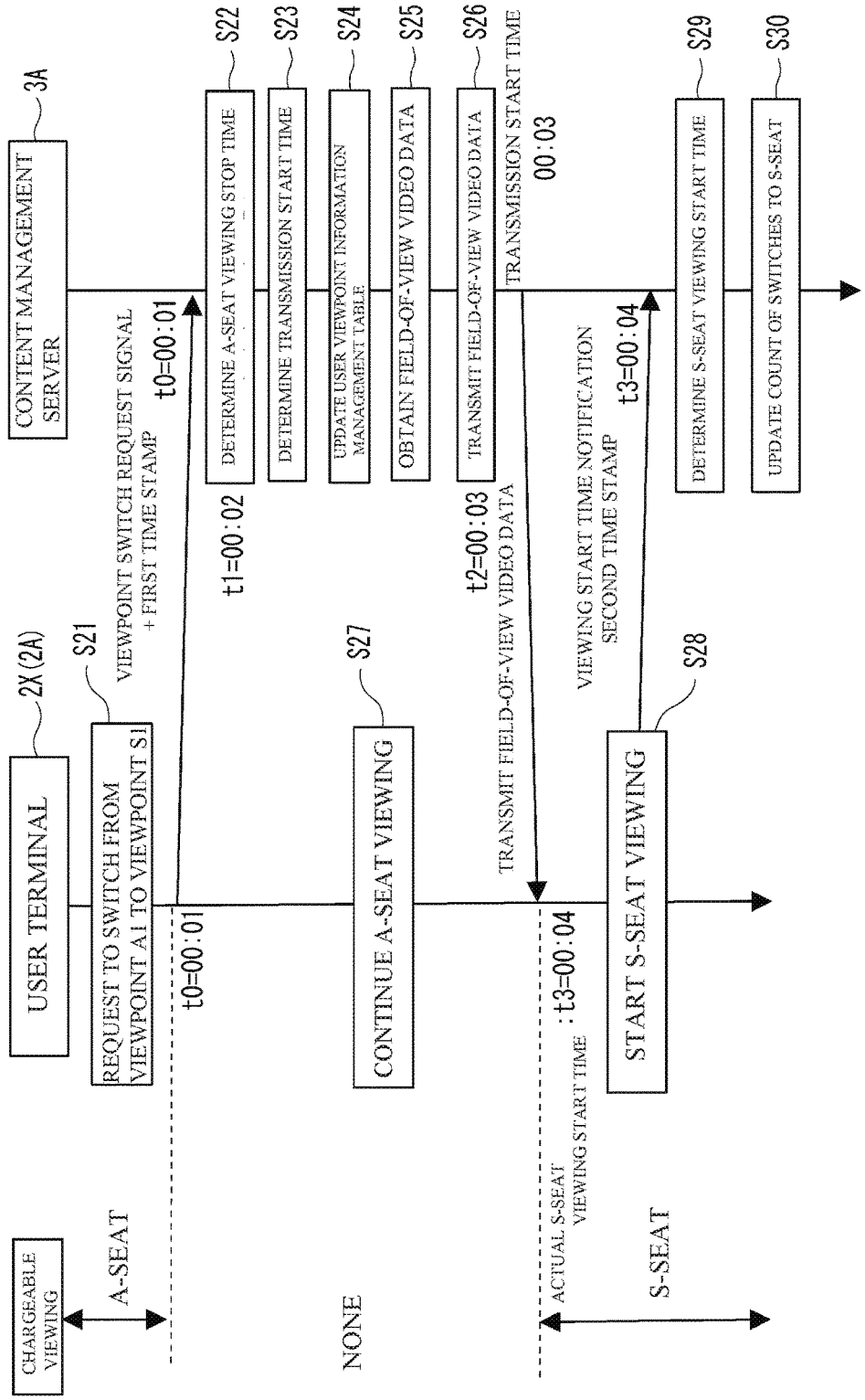
FIG. 15 is a sequence diagram of a series of processes of the video content distribution system according to at least one embodiment.

A video content distribution system according to at least one embodiment of this disclosure is described next with reference to FIG. 13 to FIG. 15. FIG. 13 is a diagram of function blocks of a control unit 22A of a user terminal 2A in at least one embodiment. FIG. 14 is a diagram of function blocks of a control unit 32A of a content management server 3A in at least one embodiment. FIG. 15 is a sequence diagram of a series of processes of the video content distribution system according to at least one embodiment. The video content distribution system according to FIG. 13 to FIG. 15 differs from the video content distribution system 100 according to FIG. 8 in the function of the control unit of each user terminal and the function of the control unit of the content management server. Specifically, the control unit 22A of the user terminal 2A includes a time stamp generating unit 226 in addition to the components of the control unit 22 according to FIG. 8. The control unit 32A of the content management server 3A differs from the control unit 32 according to FIG. 8 in the method that is used by the viewing stop time determining unit 326 to determine a viewing stop time, the method that is used by the viewing start time determining unit 327 to determine a viewing start time, and the timing at which the second charge information management table updating unit 332 updates the switch count.

As illustrated in FIG. 13, the time stamp generating unit 226 is configured to generate a first time stamp and a second time stamp by referring to a time that is indicated by the time clock 25. The first time stamp indicates a transmission start time at which the transmission unit 225 starts transmitting a viewpoint switch request signal to the content management server 3A (for example, t0=00:01). The second time stamp indicates a display start time at which the display control unit 223 starts displaying on the display unit 27 the field-of-view video from the switched-to viewpoint (for example, the viewpoint S1) (for example, t3=00:04). The transmission unit 225 transmits the first and second time stamps generated by the time stamp generating unit 226 to the content management server 3A via the communication interface 26.

A series of processes of the video content distribution system according to at least one embodiment is described next with reference to FIG. 14.

In Step S21, the user terminal 2X (transmission unit 225) first transmits to the content management server 3A a first time stamp and a viewpoint switch request signal for requesting a switch from the viewpoint A1 to the viewpoint S1 in a field-of-view video that is being displayed on the display unit 27. The first time stamp is generated by the time stamp generating unit 226, and indicates a transmission start time at which the transmission unit 225 starts transmitting the viewpoint switch request signal to the content management server 3A (t0=00:01).

In Step S22, the viewing stop time determining unit 326 determines the A-seat viewing stop time (the first viewing stop time) at which the user X stops viewing the field-of-view video from the A-seat area. Specifically, the viewing stop time determining unit 326 determines as the A-seat viewing stop time a transmission start time that is indicated by the first time stamp transmitted from the user terminal 2X (t0=00:01). The subsequent steps from Step S23 to Step S27 are the same as Steps S3 to S7, which are illustrated in FIG. 8, and descriptions thereof are therefore omitted.

In Step S28, the display control unit 223 displays the field-of-view video from the viewpoint S1 on the display unit 27, based on the field-of-view video data that is associated with the viewpoint S1. The time stamp generating unit 226 then generates the second time stamp that indicates a display start time at which the display control unit 223 starts displaying on the display unit 27 the field-of-view video from the viewpoint S1 (for example, t3=00:04). The transmission unit 225 transmits the generated second time stamp to the content management server 3.

After that, in Step S29, the viewing start time determining unit 327 determines the S-seat viewing start time (the second viewing start time) at which the user X starts viewing the field-of-view video from the S-seat area. Specifically, the viewing start time determining unit 327 determines as the S-seat viewing start time a display start time that is indicated by the second time stamp transmitted from the user terminal 2X (t3=00:04).

In Step S30, the second charge information management table updating unit 332 updates the count of switches to the viewpoint S1 and then updates the count of switches to the S-seat area to which the viewpoint S1 belongs. In particular, the reception unit 321 generates, upon receiving the second time stamp from the user terminal 2X, a display completion signal indicating that a field-of-view video associated with the viewpoint S1 has been displayed on the display unit 27, and transmits the generated display completion signal to the second charge information management table updating unit 332. The second charge information management table updating unit 332 updates the count of switches to the viewpoint S1 based on the received display completion signal, and then updates the count of switches to the S-seat area. The second charge information management table updating unit 332 updates data in the second charge information management table in this manner.

As described above, a transmission start time indicated by the first time stamp at which the transmission unit 225 starts transmitting a viewpoint switch request signal to the content management server 3 (t0=00:01) is determined as the A-seat viewing stop time, and a display start time indicated by the second time stamp at which the display control unit 223 starts displaying on the display unit 27 the field-of-view video from the viewpoint S1 (t3=00:04) is determined as the S-seat viewing start time. The period between the transmission start time t0 and the display star time t3 (3 seconds) is not counted as a field-of-view video viewing period in this manner, which helps to improve the user's degree of satisfaction with a video content distribution service and to convince the user more that the charge for the service is fair.

According to at least one embodiment, the count of switches to the viewpoint S1 is updated when the reception unit 321 receives the second time stamp from the user terminal 2X. Updating the count of switches to the viewpoint S1 (i.e., increasing the switch count by one) is therefore prevented when the user cannot view a field-of-view video from the viewpoint S1 due to a communication trouble between the content management server 3A and the user terminal 2X or the like. This helps to improve the user's degree of satisfaction with a video content distribution service and to convince the user more that the charge for the service is fair.

This concludes descriptions of some embodiments of this disclosure. However, the descriptions of some embodiments are not to be read as a restrictive interpretation of the technical scope of this disclosure. The embodiments are merely given as examples, and a person skilled in the art would understand that various modifications can be made to the embodiments within the scope of this disclosure set forth in the scope of patent claims. Thus, the technical scope of this disclosure is to be defined based on the scope of this disclosure set forth in the scope of patent claims and an equivalent scope thereof.

What is claimed is:

1. A video content distribution system, comprising a user terminal on which stored video contents are viewable and a content management server, the user terminal and the content management server being connected in a manner that allows communication to one another via a communication network,
wherein the user terminal comprises:
a first reception unit configured to receive stored field-of-view video data;
a display control unit configured to display on a display unit a field-of-view video based on the stored field-of-view video data;
a viewpoint switch request signal generating unit configured to generate, in response to input operation performed by a user on the user terminal, a viewpoint switch request signal for requesting a switch from a current viewpoint of a field-of-view video of the stored video contents displayed on the display unit, to a switched-to viewpoint, which is one of a plurality of viewpoints different from the current viewpoint; and
a first transmission unit configured to transmit the generated viewpoint switch request signal to the content management server, and
wherein the content management server comprises:
a second reception unit configured to receive the viewpoint switch request signal;
a second transmission unit configured to transmit to the user terminal the stored field-of-view video data that is associated with one of the current viewpoint and the switched-to viewpoint; and
a switch count updating unit configured to update a count of switches to the switched-to viewpoint for each of the plurality of viewpoints, wherein the content management server further comprises a charge calculating unit configured to determine an amount to be charged to the user for the viewing of the field-of-view video based on the count of switches to each viewpoint at a first viewing charge, and the respective location of each viewpoint at a second viewing charge.

2. The video content distribution system according to claim 1, wherein the content management server is configured to continue transmitting field-of-view video data that is associated with the current viewpoint to the user terminal at least for a period from a time when the first transmission unit transmits the viewpoint switch request signal to the second reception unit to a time when the first reception unit receives the stored field-of-view video data that is associated with the switched-to viewpoint from the content management server, or at least for a period from a time when the second reception unit receives the viewpoint switch request signal to a time when the second transmission unit transmits the stored field-of-view video data that is associated with the switched-to viewpoint.

3. The video content distribution system according to claim 1, wherein the content management server further comprises a charge calculating unit configured to determine an amount to be charged to the user for the viewing of the field-of-view video based on the count of switches to each viewpoint.

4. The video content distribution system according to claim 2, wherein the content management server further comprises a charge calculating unit configured to determine an amount to be charged to the user for the viewing of the field-of-view video based on the count of switches to each viewpoint.

5. The video content distribution system according to claim 1, wherein the switch count updating unit is configured to update the count of switches to the switched-to viewpoint in response to the second transmission unit transmitting the stored field-of-view video data that is associated with the switched-to viewpoint to the user terminal.

6. The video content distribution system according to claim 2, wherein the switch count updating unit is configured to update the count of switches to the switched-to viewpoint in response to the second transmission unit transmitting the stored field-of-view video data that is associated with the switched-to viewpoint to the user terminal.

7. The video content distribution system according to claim 3, wherein the switch count updating unit is configured to update the count of switches to the switched-to viewpoint in response to the second transmission unit transmitting the stored field-of-view video data that is associated with the switched-to viewpoint to the user terminal.

8. The video content distribution system according to claim 1,
wherein the user terminal further comprises a time stamp generating unit configured to generate a time stamp that indicates a display start time at which the display control unit starts displaying a field-of-view video from the switched-to viewpoint on the display unit, and
wherein the switch count updating unit is configured to update the count of switches to the switched-to viewpoint when the second reception unit receives the time stamp from the user terminal.

9. The video content distribution system according to claim 2,
wherein the user terminal further comprises a time stamp generating unit configured to generate a time stamp that indicates a display start time at which the display control unit starts displaying a field-of-view video from the switched-to viewpoint on the display unit, and
wherein the switch count updating unit is configured to update the count of switches to the switched-to viewpoint when the second reception unit receives the time stamp from the user terminal.

10. The video content distribution system according to claim 3,
wherein the user terminal further comprises a time stamp generating unit configured to generate a time stamp that indicates a display start time at which the display control unit starts displaying a field-of-view video from the switched-to viewpoint on the display unit, and
wherein the switch count updating unit is configured to update the count of switches to the switched-to viewpoint when the second reception unit receives the time stamp from the user terminal.

11. The video content distribution system according to claim 1,
wherein the switch count updating unit is configured to update a count of switches to a seat area that is associated with the switched-to viewpoint, and
wherein the charge calculating unit is configured to determine an amount to be charged to the user for the viewing of the field-of-view video based on a count of switches to each seat area.

12. The video content distribution system according to claim 2,
wherein the switch count updating unit is configured to update a count of switches to a seat area that is associated with the switched-to viewpoint, and
wherein the charge calculating unit is configured to determine an amount to be charged to the user for the viewing of the field-of-view video based on a count of switches to each seat area.

13. The video content distribution system according to claim 3,
wherein the switch count updating unit is configured to update a count of switches to a seat area that is associated with the switched-to viewpoint, and
wherein the charge calculating unit is configured to determine an amount to be charged to the user for the viewing of the field-of-view video based on a count of switches to each seat area.

14. The video content distribution system according to claim 6,
wherein the switch count updating unit is configured to update a count of switches to a seat area that is associated with the switched-to viewpoint, and
wherein the charge calculating unit is configured to determine an amount to be charged to the user for the viewing of the field-of-view video based on a count of switches to each seat area.

15. The video content distribution system according to claim 8,
wherein the switch count updating unit is configured to update a count of switches to a seat area that is associated with the switched-to viewpoint, and
wherein the charge calculating unit is configured to determine an amount to be charged to the user for the viewing of the field-of-view video based on a count of switches to each seat area.

16. A content management server, which is connected to a user terminal on which stored video contents are viewable in a manner that allows communication between the user terminal and the content management server via a communication network, the content management server comprising:
a second reception unit configured to receive from the user terminal a viewpoint switch request signal for requesting a switch from a current viewpoint of a field-of-view video of the stored video contents displayed on the user terminal, to a switched-to viewpoint, which is one of a plurality of viewpoints different from the current viewpoint;
a second transmission unit configured to transmit to the user terminal field-of-view video data that is associated with one of the current viewpoint or the switched-to viewpoint;
a switch count updating unit configured to update a count of switches to the switched-to viewpoint for each of the plurality of viewpoints; and
a charge calculating unit configured to determine an amount to be charged to the user for the viewing of the field-of-view video based on the count of switches to each viewpoint at a first viewing charge, and the respective location of each viewpoint at a second viewing charge.

17. The content management server according to claim 16, wherein field-of-view video data that is associated with the current viewpoint is kept transmitted to the user terminal at least for a period from a time when the second reception unit receives the viewpoint switch request signal to a time when the second transmission unit transmits field-of-view video data that is associated with the switched-to viewpoint.

* * * * *